(12) United States Patent
Hayasaka et al.

(10) Patent No.: US 10,191,934 B2
(45) Date of Patent: Jan. 29, 2019

(54) DE-DUPLICATION SYSTEM AND METHOD THEREOF

(71) Applicant: HITACHI, LTD., Tokyo (JP)

(72) Inventors: Mitsuo Hayasaka, Tokyo (JP); Hitoshi Kamei, Tokyo (JP); Atsushi Sutoh, Tokyo (JP)

(73) Assignee: HITACHI, LTD., Tokyo (JP)

( * ) Notice: Subject to any disclaimer, the term of this patent is extended or adjusted under 35 U.S.C. 154(b) by 546 days.

(21) Appl. No.: 14/760,721

(22) PCT Filed: May 13, 2013

(86) PCT No.: PCT/JP2013/063338
§ 371 (c)(1),
(2) Date: Jul. 14, 2015

(87) PCT Pub. No.: WO2014/184857
PCT Pub. Date: Nov. 20, 2014

(65) Prior Publication Data
US 2015/0356134 A1 Dec. 10, 2015

(51) Int. Cl.
*G06F 17/00* (2006.01)
*G06F 17/30* (2006.01)
*G06F 3/06* (2006.01)

(52) U.S. Cl.
CPC ........ *G06F 17/30371* (2013.01); *G06F 3/067* (2013.01); *G06F 3/0608* (2013.01);
(Continued)

(58) Field of Classification Search
CPC ................................................ G06F 17/30159
(Continued)

(56) References Cited

U.S. PATENT DOCUMENTS 5,990,810 A 11/1999 Williams
6,704,724 B1 * 3/2004 Ellmann ........... G06F 17/30445
707/718
(Continued)

FOREIGN PATENT DOCUMENTS

JP 2011-065314 A 3/2011

OTHER PUBLICATIONS

A.Z. Broder, "Some applications of Rabin's fingerprinting Method," Sequence II: Methods in Communications, Security, and Computer Science, pp. 143-152 (1993).

*Primary Examiner* — Eliyah S. Harper
(74) *Attorney, Agent, or Firm* — Volpe and Koenig, P.C.

(57) ABSTRACT

Chunk de-duplication performance is improved. A de-duplication system has a cut-out processing unit which inputs a content from a client terminal thereinto, determines a calculation range from a predetermined maximum chunk size and a predetermined minimum chunk size, divides the calculation range into at least two small calculation ranges, sets the positions of windows for rolling hash calculation so that the rolling hash calculation is continuous between the two small calculation ranges, and subjects the at least two small calculation ranges to the rolling hash calculation with shifting of the windows based on parallel processing to cut out a chunk from the content, and a de-duplication processing unit which does not store the cut-out chunk into a storage device when the chunk having the same contents as those of the cut-out chunk is already stored in the storage device.

14 Claims, 19 Drawing Sheets

(52) U.S. Cl.
CPC ........ *G06F 3/0641* (2013.01); *G06F 17/3033* (2013.01); *G06F 17/30159* (2013.01); *G06F 17/30342* (2013.01); *G06F 17/30097* (2013.01)

(58) Field of Classification Search
USPC .......................................................... 707/698
See application file for complete search history.

(56) References Cited

U.S. PATENT DOCUMENTS

| | | | |
|---|---|---|---|
| 7,899,243 B2* | 3/2011 | Boncyk | A61F 9/08 382/165 |
| 8,234,468 B1 | 7/2012 | Deshmukh et al. | |
| 8,285,957 B1 | 10/2012 | Nag et al. | |
| 9,087,094 B2* | 7/2015 | Netz | G06F 17/30454 |
| 9,183,200 B1* | 11/2015 | Liu | G06F 17/30008 |
| 9,442,914 B2* | 9/2016 | Alvey | G06F 17/245 |
| 2002/0152218 A1* | 10/2002 | Moulton | G06F 17/30097 |
| 2006/0059173 A1* | 3/2006 | Hirsch | G06F 11/1453 |
| 2006/0059207 A1* | 3/2006 | Hirsch | G06F 11/1453 |
| 2009/0276454 A1* | 11/2009 | Smith | G06F 17/30162 |
| 2010/0106691 A1 | 4/2010 | Preslan et al. | |
| 2011/0066666 A1 | 3/2011 | Takaoka et al. | |
| 2011/0238635 A1 | 9/2011 | Leppard | |
| 2012/0110045 A1 | 5/2012 | Takaoka et al. | |
| 2012/0158672 A1 | 6/2012 | Oltean et al. | |
| 2013/0151464 A1* | 6/2013 | Hermann | G06Q 30/04 707/600 |
| 2015/0356134 A1* | 12/2015 | Hayasaka | G06F 3/0608 707/692 |
| 2016/0188589 A1* | 6/2016 | Guilford | G06F 17/30156 707/692 |
| 2017/0344579 A1* | 11/2017 | Basireddy | G06F 17/3015 |

\* cited by examiner

FIG. 3

| 300 | SMALL CALCULATION RANGE 310 | START POSITION 320 | END POSITION 330 | DIVISION POINT 340 | HASH VALUE 350 |
|---|---|---|---|---|---|
| | Call-0 | Cmin | [(Cmax-Cmin)]/2-m+1 | | |
| | Call-1 | [(Cmax-Cmin)]/2-m+2 | Cmax-m+1 | | |

DE-DUPLICATION SYSTEM AND METHOD THEREOF

TECHNICAL FIELD

The present invention relates to a system for de-duplicating data stored into a storage device and a method thereof.

BACKGROUND ART

In recent years, a technique called big data analysis which creates new values by analyzing enormous data about a social infrastructure including a social networking service, finance, medical care, and traffic has been put into practical use. In the big data analysis, the capacity of both input data collected from the social infrastructure and output data which is analysis results thereof is very large to increase with time. To protect such explosively increasing data, backup is performed. When plural generation data pieces are stored, larger storage capacity is necessary.

This problem is noticeable, for instance, when a cloud service is used to perform the big data analysis. In many cases, the computation resource of the cloud service is calculated based on computer performance and utilization time, and the storage resource thereof is calculated based on data capacity and a recording period. For this reason, with increased data capacity, in the total cost, the charge of the storage resource becomes more dominant than that of the computation resource. The cost for using the cloud service performing the big data analysis thus becomes very high.

To lower the cost required for each storage device storing data, data capacity is reduced. In file compression, data segments which are data portions having the same contents in one file are shrunk to reduce data capacity. In de-duplication, the data segments having the same contents, not only in one file but also in plural files, are shrunk to reduce the total data capacity in a file system and a storage system. De-duplication is typically required to improve the de-duplication efficiency for reducing more storage capacity (total data capacity stored in each storage device), to improve the de-duplication process ability for reducing de-duplication process time, and to reduce the de-duplicated data management overhead.

Each data segment which is a de-duplication unit is referred to as a chunk. In addition, logically unified data as a unit to be stored into a storage device is referred to as a content. The content includes a general file, and a file aggregating general files such as an archive file, a backup file, and a virtual computer volume file.

The de-duplication process includes a process for cutting out each chunk from a content, and a chunk storing process including a process for determining the presence or absence of de-duplication of the cut-out chunk. To increase the de-duplication rate, it is important to, in the chunk cut-out process, cut out more data segments having the same contents.

To cut out each chunk, there are a fixed length chunk method and a variable length chunk method. In the fixed length chunk method, each chunk having a fixed length of e.g., 4 KB (kilobytes) and 1 MB (megabytes) is cut out from the beginning of a content. In the fixed length chunk method, the chunk cut-out process time is short. In addition, the fixed length chunk method is effective because the de-duplication rate becomes high when there are many simply-copied contents without data change or when data is only partially overwritten with data change. However, in the fixed length chunk method, when data is inserted into and deleted from a content, the following chunk is shiftably cut out to be a different chunk. Consequently, the de-duplication rate is low although the chunk cut-out performance is high.

On the other hand, in the variable length chunk method, a chunk shifted due to data change in a content is cut out. In the variable length chunk method, the chunk cut-out boundary (division point) is determined based on the local condition of content data. Even when data is inserted into a content, the local condition to be the boundary is not changed. The boundary is thus in the same place before and after insertion and deletion of data. However, it is serially determined byte by byte whether byte data in a content matches with the local condition according to the condition presenting the byte data are all or sampling byte data in the content. Consequently, the chunk cut-out performance is low although the de-duplication rate is high.

Form the above, to improve both the de-duplication rate and the chunk cut-out performance, it is important to improve the variable length chunk method.

PTL 1 discloses a de-duplication method using the variable length chunk method. To make the chunk cut-out process faster, the disclosed method uses rolling hash calculation to cut out a variable length chunk. In the rolling hash calculation, a window having a fixed size is prepared to calculate a hash in the byte sequence in the window, and it is then determined whether the hash matches with the local condition. The window is slid byte by byte in the content to determine whether all data in the content matches with the local condition. The hush obtained when all data in the content matches with the local condition is the chunk division point. In the rolling hash calculation, the hash value of the window before sliding is used for calculating the hash value of the window after sliding. The chunk cut-out process can thus be faster.

NPTL 1 discloses a method in which a calculation value which always appears in the rolling hash calculation is previously held in a table to omit calculation therefor, thereby making the chunk cut-out process faster.

CITATION LIST

Patent Literature

Patent Literature 1: U.S. Pat. No. 5,990,810A

Non-Patent Literature

NPTL 1: A. Z. Broder: Some applications of Rabin's fingerprinting Method, Sequence II: Methods in Communications, Security, and Computer Science, pp. 143-152 (1993)

SUMMARY OF INVENTION

Technical Problem

As described above, even with the use of the rolling hash calculation, the variable length chunk method is required to serially determine byte by byte according to the sampling condition whether all byte data in the content matches with the local condition. The improvement in the performance of the chunk cut-out process is thus limited.

Parallel processing is typically effective for improving the process performance. However, each process based on parallel processing needs to be independent. Serial processing which uses each previous process result, like the rolling hash calculation, cannot be directly changed to parallel processing.

Solution to Problem

The disclosed de-duplication system has a cut-out processing unit which inputs a content from a client terminal thereinto, determines a calculation range from a predetermined maximum chunk size and a predetermined minimum chunk size, divides the calculation range into at least two small calculation ranges, sets the positions of windows for rolling hash calculation so that the rolling hash calculation is continuous between the two small calculation ranges, and subjects the at least two small calculation ranges to the rolling hash calculation with shifting of the windows based on parallel processing to cut out a chunk from the content, and a de-duplication processing unit which does not store the cut-out chunk into a storage device when the chunk having the same contents as those of the cut-out chunk is already stored in the storage device.

Advantageous Effects of Invention

According to the present invention, the de-duplication performance of the de-duplication system can be improved.

BRIEF DESCRIPTION OF DRAWINGS

FIG. 3 is a division point record table which records a chunk division point.

DESCRIPTION OF PREFERRED EMBODIMENT

To clear the terms used in the description of an embodiment and the difference between the embodiment and a conventional art, a chunk cut-out process using rolling hash calculation in the conventional art will be described. The terms specific to this embodiment will be described later.

Figure 20A:
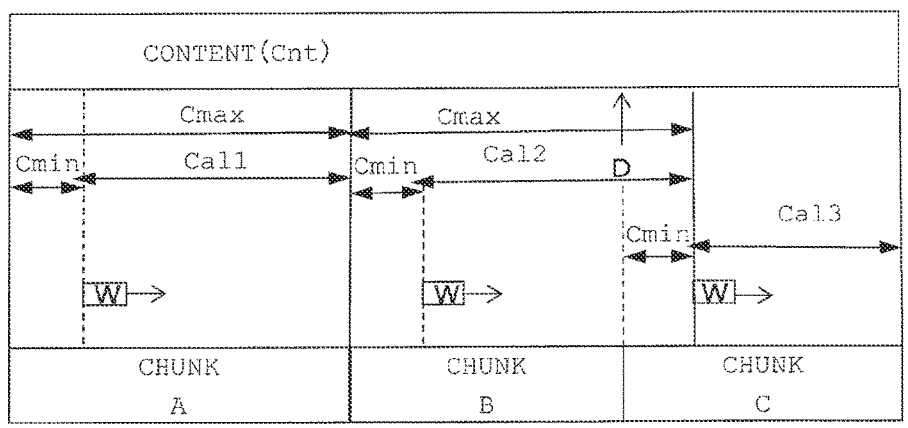
FIGS. 20A and 20B are explanatory views of a chunk cut-out process in a conventional art.
Figure 20B:
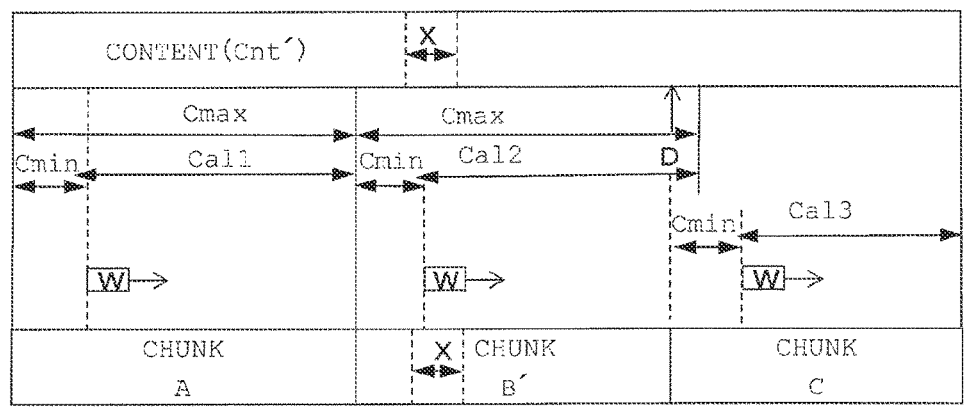

FIGS. 20A and 20B show a chunk cut-out process in the conventional art. In content (Cnt) shown in FIG. 20A, variable length chunks A to C are cut out to be stored into a predetermined storage device. In content (Cnt') shown in FIG. 20B, data X is added to the portion corresponding to chunk B in content (Cnt).

Maximum chunk size (Cmax) and minimum chunk size (Cmin) of each chunk cut out from content (Cnt) and the size of a window (W in the drawing) for using rolling hash calculation (the window size has a fixed length of m) have predetermined byte values in a de-duplication system. For instance, in the de-duplication system, when 12 kilobytes is assumed as an average chunk size, Cmin=8 kilobytes and Cmax=16 kilobytes. When maximum chunk size (Cmax) is too large, the chunk size of one chunk is likely to be increased, so that the chunks are unlikely to be overlapped. When minimum chunk size (Cmin) is too small, the chunk size of one chunk is likely to be decreased, so that the number of chunks in the content is increased. The chunk management overhead is thus increased. Therefore, in the de-duplication system, maximum chunk size (Cmax) and minimum chunk size (Cmin) are previously determined. In addition, the window size is e.g., m=48 bytes.

The chunk division point is determined when the chunk size is maximum chunk size (Cmax) and when the hash value of the window (the hash value of the data included in m bytes of window W) satisfies a predetermined condition. In the latter, the trailing edge of the window satisfying the predetermined condition (the right end in the drawing) is the chunk division point. The predetermined condition is predetermined hash value h(cond).

In the rolling hash calculation, while the window is slid byte by byte (to the right in the drawing), the hash values are serially calculated by using the previous hash values thereof as follows. When the hash values at the i byte to the m byte of the window are h(i to i+m−1), the hash value at the i byte is h(i), and the hash value at the i+m byte is h(i+m), the window hash values h(i+1 to i+m) included at the i+1 byte to the m byte are calculated by h(i+1 to i+m)=f{h(i to i+m−1), h(i), h(i+m)} (f represents predetermined computation). Such serial calculation is started from the point where the byte of minimum chunk size (Cmin) is the start position of the window. Specifically, the rolling hash computation is started from window W in the position where minimum chunk size (Cmin) is set as the beginning of the rolling hash calculation based on the beginning of the content (the left end in the drawing) or the beginning of the chunk (the left end in the drawing, the next byte following the last byte of the previous cut-out chunk or the new chunk to be cut out) (the right end in the drawing which is the head of the sliding direction of the window (the arrow in the drawing)). The hash calculation is executed as-is for the hash values h(Cmin to Cmin+m−1) in the start position. The rolling hash computation is executed for up to the hash values h(Cmax−m+1 to Cmax) in which the window includes the Cmax byte for the first time. Calculation range (Cal) of the rolling hash computation is (Cmax−Cmin−m+1)

at the maximum. The maximum number of times of sliding of window W is (Cmax−Cmin−m). No hash values are required to be calculated to Cmin.

Even with data change in the content, the chunk division point is not changed unless the hash value of window W which determines the chunk division point is changed.

In content (Cnt) in FIG. 20A, the trailing edge of window W (the right end in the drawing) skips to minimum chunk size (Cmin) so that the hash values in the byte sequence in window W are calculated by shifting window W byte by byte. In chunk A, maximum chunk size (Cmax) is the division point because in calculation range (Cal1), no hash values of the window shifted byte by byte satisfy predetermined condition h(cond). As in chunk A, the cut-out process of chunk B repeats the same computation from the point where window W skips to minimum chunk size (Cmin) from the division point of chunk A. The cut-out process of chunk B ends the computation in calculation range (Cal2) in which the division point (in the drawing, D) satisfies the predetermined condition. The cut-out process of chunk C repeats the same computation from the point where window W skips to minimum chunk size (Cmin) from division point D of chunk B. The cut-out process of chunk C ends the computation because the division point satisfying the predetermined condition is absent in calculation range (Cal3) and the window slides to the last byte of content (Cnt). By the above process, chunks A to C are cut out from the content (Cnt). FIG. 20B shows content (Cnt') in which data X is added to the portion corresponding to chunk B of content (Cnt). By the same process as content (Cnt), chunk A of content (Cnt') is cut out. As in chunk B, chunk B' is cut out. Division point D where chunk B' is cut out is shifted from the division point where chunk B is cut out by the number of bytes of data X. However, it can be highly expected that the predetermined condition can be satisfied because division point D is determined. As a result, chunks A, B', and C are cut out.

When content (Cnt') is stored into the storage device which stores content (Cnt) including chunks A to C, chunk B' is stored so that the entities of chunks A and C are not stored. Storing de-duplication is thus enabled. However, reference information showing content (Cnt') including chunks A, B', and C is stored.

In this way, the variable length chunk method has the advantage of increasing the de-duplication rate of the content subjected to insertion and deletion, but has the disadvantage of the calculation overhead of the hash value for determining the boundary between the chunks (division point). In addition, the cut-out process of chunk B or chunk B' can be executed only after the division point of chunk A is determined, and the cut-out process of chunk C can be executed only after the division point of chunk B or chunk B' is determined. For this reason, it is difficult to execute the process for determining the division point of chunks A, B, and C or chunks A, B', and C based on parallel processing.

Hereinafter, the embodiment will be described by illustrating examples.

EXAMPLE 1

Figure 1:
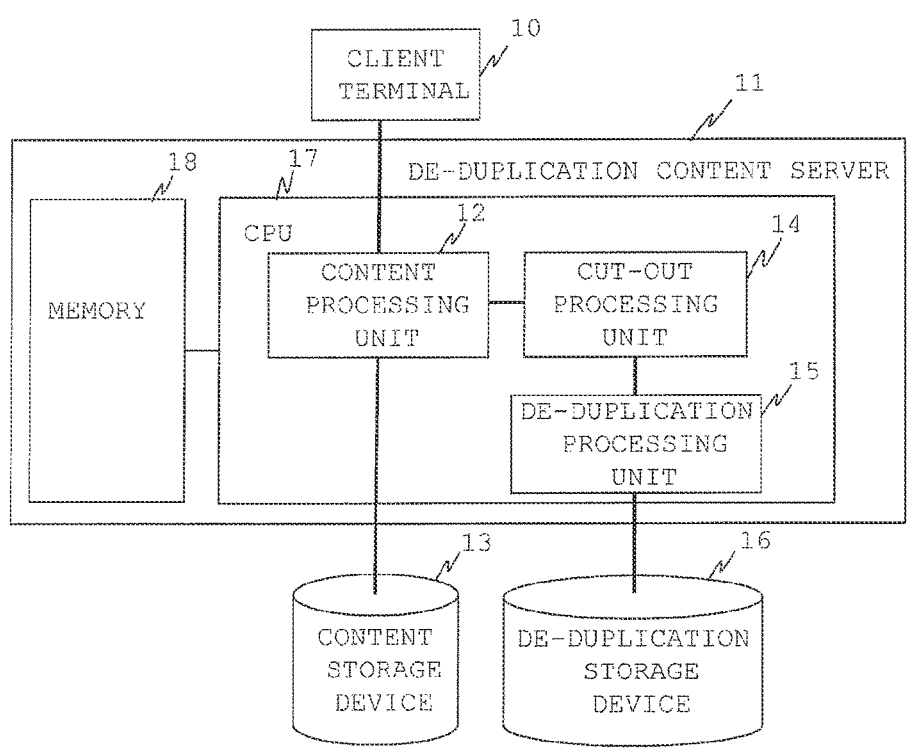
FIG. 1 is a block diagram of a de-duplication system.

FIG. 1 is a block diagram of the de-duplication system in this embodiment. The de-duplication system includes a client terminal 10 connected to a de-duplication content server 11, a content storage device 13, and a de-duplication storage device 16. The de-duplication content server 11 inputs a content from the client terminal 10 thereinto to store the content into the content storage device 13, and de-duplicates the content to store the de-duplicated content into the de-duplication storage device 16.

A content processing unit 12 is a file server which stores and reads the content inputted from the client terminal 10 into and from the content storage device 13. The content processing unit 12 outputs the content read from the content storage device 13 to a cut-out processing unit 14. Although described later, the content processing unit 12 may output the content inputted from the client terminal 10 to the cut-out processing unit 14.

The cut-out processing unit 14 inputs the content from the content processing unit 12 thereinto to cut out a chunk from the inputted content. A de-duplication processing unit 15 inputs the chunk cut out from the cut-out processing unit 14 thereinto, and de-duplicates the chunk to store the de-duplicated chunk into the de-duplication storage device 16.

In this example, the cut-out processing unit 14 may only input the content from the content processing unit 12 thereinto. Therefore, the content processing unit 12 is not required to store the content into the content storage device 13. However, in this example, the content storage device 13 is provided to store the content inputted from the client terminal 10 thereinto.

As described below, the processes of the content processing unit 12, the cut-out processing unit 14, and the de-duplication processing unit 15 are executed by a CPU (processor) 17, as needed, by using data, such as later-described predetermined condition h(cond) stored into a memory 18.

Figure 2:
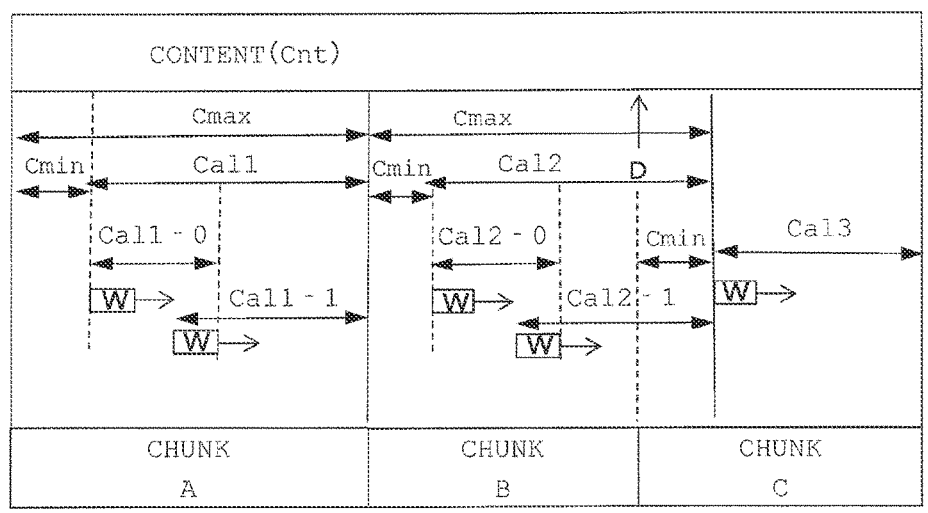
FIG. 2 is a diagram of assistance in explaining a chunk cut-out process.

FIG. 2 is a diagram of assistance in explaining the chunk cut-out process of the cut-out processing unit 14 by comparison with FIGS. 20A and 20B. To execute the cut-out process based on parallel processing, calculation range (Cal) in FIGS. 20A and 20B is divided into small calculation ranges [0] ... [N−1]. The small calculation ranges [0] ... [N−1] which are calculation ranges for parallel processing may be obtained by substantially equally dividing calculation range (Cal) according to the number of parallel processes (the number of single instruction multiple data processes, and the maximum number of multiple cores in parallel) of a computer configuring the de-duplication content server 11. Here, for simplifying the description, the number of parallel processes is 2 (N=2), and the small calculation ranges are [0] and [1]. For instance, in FIG. 2, small calculation ranges [0] and [1] obtained by dividing calculation range (Cal1) in FIGS. 20A and 20B into two are small calculation ranges (Cal1−0) and (Cal1−1).

The start position (the initial position of the window) of the chunk cut-out process in small calculation range (Cal1−0) is the same as that in the cut-out process of chunks A and B in FIGS. 20A and 20B. In addition, the end position (the last position of the window) of the chunk cut-out process in small calculation range (Cal1−1) is the same as that in the cut-out process of chunks A and B in FIGS. 20A and 20B. That is, the end position is the position where maximum chunk size (Cmax) is the division point unless each hash value of the window shifted byte by byte satisfies predetermined condition h(cond) in small calculation range (Cal1−1). The end position is the position where each hash value of the window shifted byte by byte satisfies predetermined condition h(cond) in small calculation range (Cal1−1) (the right end of the window in the drawing).

Predetermined condition h(cond) for finding the division point after this example may be not only the previous hash value but also a maximum hash value and a minimum hash value calculated in each of the calculation ranges.

In the end position of the chunk cut-out process in small calculation range (Cal1-0) (the last position of the window) and the start position of the chunk cut-out process in small calculation range (Cal1-1), the window positions are overlapped to hold the matching ability in parallel processing. That is, the positions of the windows in the adjacent small calculation ranges are overlapped to continue the rolling hash calculation at the bytes. The number of bytes for overlap is m−2 when the size of window W has m bytes. The end position of the chunk cut-out process in small calculation range (Cal1-0) is the position where the trailing edge of window W (the right end in the drawing) is the terminal end in small Calculation range (Cal1-0) (the right end in the drawing). The start position of the chunk cut-out process in small calculation range (Cal1-1) is the position of the window which is shifted by m−1 bytes from the end position of the chunk cut-out process in small calculation range (Cal1-0) in the opposite direction of the sliding direction.

The windows are overlapped between the small calculation ranges without depending on the number of parallel processes. The rolling hash value calculation of the windows overlapped between the adjacent small calculation ranges is thus enabled. The division point cannot be shifted from the chunk division point in serial processing shown in FIGS. 20A and 20B. The de-duplication rate can thus be prevented from being lowered.

Here, the following point should be considered. For instance, it is necessary to check that the division point is not found in small calculation range (Cal1-0) after completion of the hash calculation of small calculation range (Cal1-0) even when the hash value of the window satisfies predetermined condition h (cond) in small calculation range (Cal1-1) to designate the division point. This example is shown in the cut-out process of chunk B in FIG. 2. In the cut-out process of chunk B, chunk B is divided into small calculation ranges (Cal2-0) and (Cal2-1) which are subjected to parallel processing. Even when division point D is found in small calculation range (Cal2-1), it cannot be determined whether chunk B is cut out by using division point D until the hash calculation in small calculation range (Cal2-0) is ended. This is because chunk B is required to have the byte sequence with the length from the boundary between chunks A and B to the division point. The division point found in small calculation range (Cal2-0) is required to be the division point for the chunk cut-out process even when division point D is found in small calculation range (Cal2-1). It is necessary to process small calculation range (Cal2-0) in its entirety for determining whether the division point is found therein.

The process for finding the chunk division point (hereinafter, a chunk division point finding process) is required to be executed based on parallel processing to provide the same division point as serial processing or as when the number of parallel processes is changed.

When the content size is equal to or less than minimum chunk size (Cmin), the single chunk (single instance) method is executed which handles the entire content as one chunk without executing the chunk cut-out process.

FIG. 3 shows a division point record table 300 into which the cut-out processing unit 14 records the chunk division point. The division point record table 300, not shown in FIG. 1, is arranged on the memory which can be referred to and recorded from each later-described process based on parallel processing in the de-duplication content server 11. The division point record table 300 includes a small calculation range 310, a start position 320 where window W is set first in the small calculation range, an end position 330 where window W is set last in the small calculation range, a division point 340 which is the division point found in the small calculation range, and a hash value 350. Each of the start position 320, the end position 330, and the division point 340 represents the offset (the number of bytes) from the beginning of the calculation range (e.g., the left end of calculation range Cal1 in FIG. 2). Into the hash value 350, predetermined condition h(cond) for finding the division point is recorded.

The start position 320 and the end position 330 show the leading edge of the set window in the sliding direction (e.g., the right end of window W in FIG. 2). When calculation range (Cal1) in FIG. 2 has the number of parallel processes of 2, the start position 320 in small calculation range (Cal1-0) is Cmin, and the end position is (Cmax−Cmin)/2−m+1. The size of the small calculation range typically has the number of parallel processes of N−1. Since (Cmax−Cmin)/(N−1) is not always an integer, as shown in FIG. 3, the end position in the small calculation range takes an integer value. The start position in the next small calculation range takes an integer value in the same manner. Process missing can thus be eliminated at the boundary between the small calculation ranges.

In the division point record table 300 in FIG. 3, calculation range (Cal1) is divided into two small calculation ranges (Cal1-0, Cal1-1). The small calculation ranges are sequentially arranged from the beginning of the content (the left end of content (Cnt) in FIG. 2). When the number of parallel processes is N−1, rows up to small calculation range (Cal1-N−1) are provided.

Figure 4:
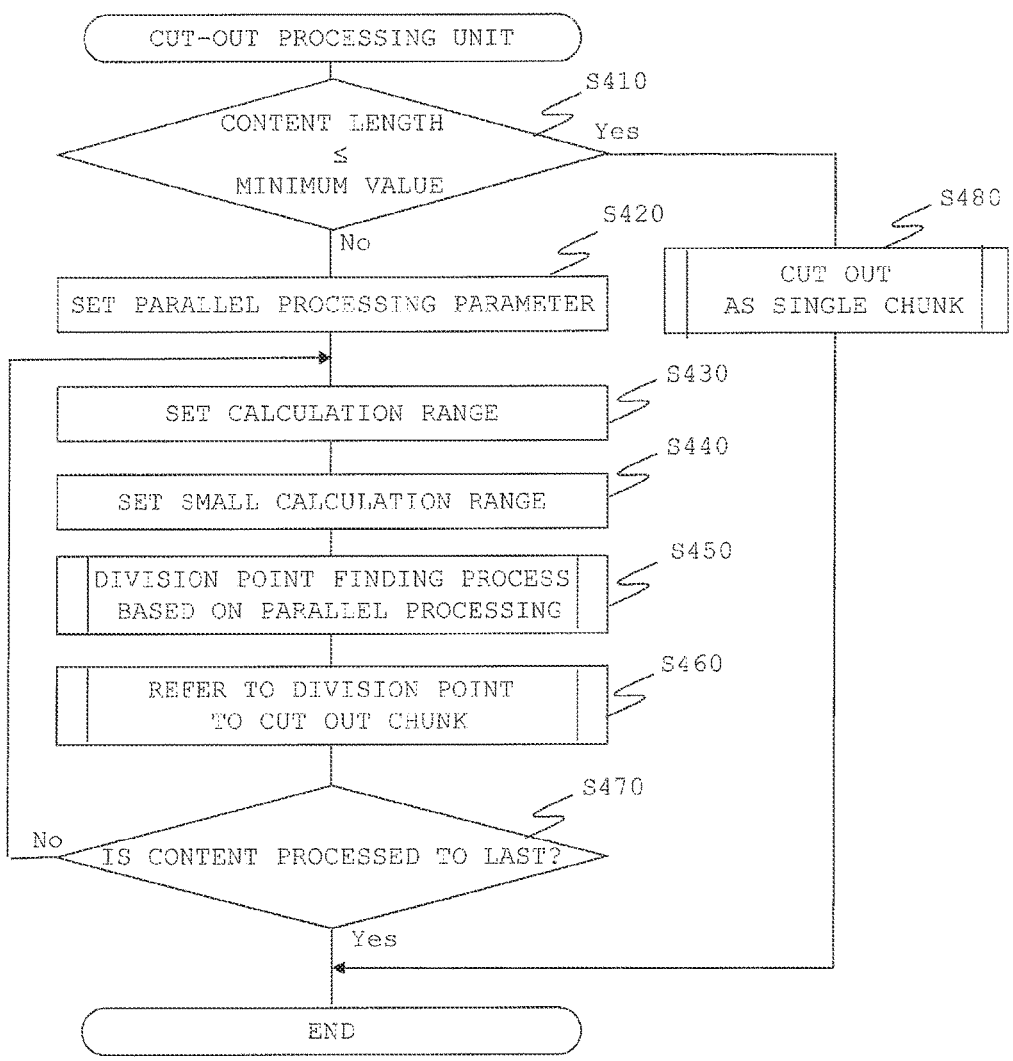
FIG. 4 is a flowchart of the process of a cut-out processing unit in Example 1.

FIG. 4 is a flowchart of the process of the cut-out processing unit 14. The size of the content inputted from the content processing unit 12 is evaluated (S410). The content size is included in metadata in which the content is stored into the content storage device 13 and interface information in which the content processing unit 12 inputs the content from the client terminal 10 thereinto. When the content size is equal to or less than minimum chunk size (Cmin) set as the chunk minimum value, the inputted content is one chunk (S480). Minimum chunk size (Cmin) is set because, as described above, the de-duplication rate and the data storing efficiency cannot be remarkably improved even when the small chunk is de-duplicated.

On the other hand, when the content size is more than the chunk minimum value (minimum chunk size (Cmin)), the number of parallel processes is set as a parallel processing parameter (S420). As described above, the number of parallel processes is the number of parallel processes of the computer configuring the de-duplication content server 11, the number of single instruction multiple data processes, and the maximum number of multiple cores in parallel.

Calculation ranges (Cal1, Cal2, . . . ) are determined from minimum chunk size (Cmin) and maximum chunk size (Cmax). The number of parallel processes set as a parallel processing parameter is referred to determine small calculation ranges (Cal1-0, Cal1-1, Cal2-0, Cal2-1, . . . ) (S430) to store small calculation ranges (Cal1-0, Cal1-1, Cal2-0, Cal2-1, . . . ) into the division point record table 300. The start position 320 and the end position 330 in each of the small calculation ranges are set into the division point record table 300 to clear the regions of the division point 340 and the hash value 350 (S440). As shown in FIG. 3, the start position 320 and the end position 330 are set.

The division point finding process based on parallel processing is executed to small calculation ranges (e.g., the small calculation ranges (Cal1-0) and (Cal1-1) (S450). The found division point is referred to cut out a chunk (S460).

S430 to S460 are repeated to the last of the inputted content (S470). At the last stage of the content, assume that the number of bytes which has not subjected to the division point finding process is equal to or less than (Cmax−Cmin)/2 where the number of parallel processes is 2. In this case, this may be serially processed as one calculation range without executing the division point finding process based on parallel processing.

Figure 5:
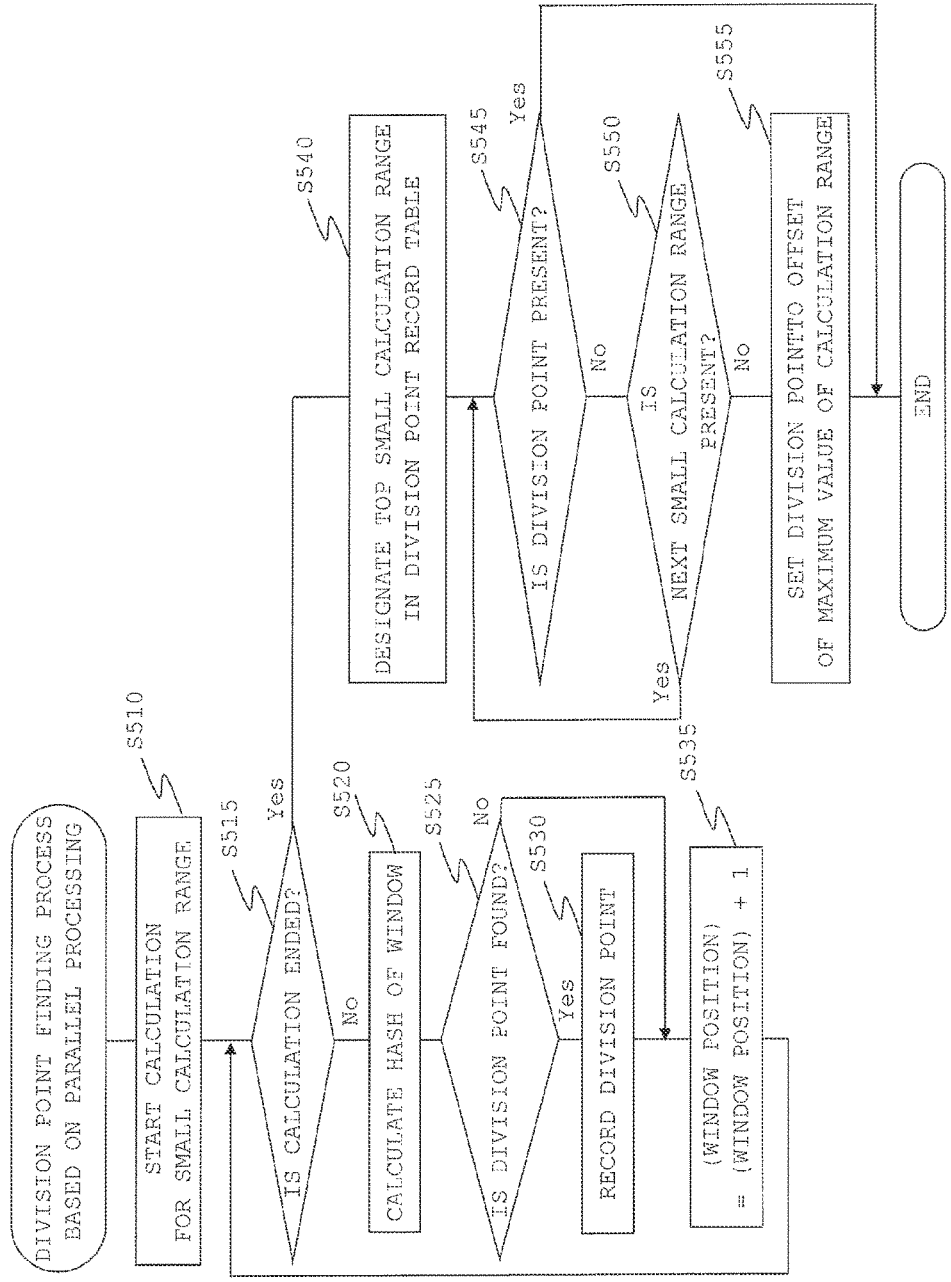
FIG. 5 is a flowchart of a division point finding process based on parallel processing.

FIG. 5 is a flowchart of the division point finding process based on parallel processing in S450 in FIG. 4. Window W is set to the start position 320 in each of the small calculation ranges (e.g., Cal1-0, Cal1-1) set into the division point record table 300 in S440 in FIG. 4 (S510). Each of the small calculation ranges is subjected to parallel processing in S515 to S535. After S540, a division point determination process after parallel processing is executed.

The end of the calculation is determined in each of the small calculation ranges (S515). There are two cases for determining the end of the calculation. First, the division point is found in the first small calculation range (e.g., Cal1-0) in the calculation range. At this time, the division point is the chunk division point, so that parallel processing can be ended. The finding of the division point is identified because the division point of the first small calculation range (e.g., Cal1-0) in the calculation range is recorded into the division point record table 300 in S530. In this case, another small calculation range (e.g., Cal1-1) subjected to parallel processing is also ended. The processes of the small calculation ranges based on parallel processing are ended according to recording of the division point 340 in the first small calculation range (e.g., Cal1-0) in the calculation range into the division point record table 300 and monitoring thereof and end flag setting and monitoring thereof. This can omit wasted calculation. Secondly, window W slid (shifted byte by byte) exceeds the end position 330 set into the division point record table 300.

When the calculation is not ended, the rolling hash calculation of set window W is executed (S520). When the result of the rolling hash calculation satisfies predetermined condition h(cond) (S525), the division point is found, the division point being at the leading edge of window W in the sliding direction. The found division point (the offset of the leading edge of window W in the sliding direction from the beginning of the calculation range) is recorded into the division point 340 of the division point record table 300, so that the hash value (predetermined condition h(cond)) obtained when the division point is found is recorded (S530). According to predetermined condition h(cond), the hash value may be recorded or may not be recorded. For instance, when h(cond) is the maximum hash value or the minimum hash value which appears in the calculation range, it is necessary to record the maximum hash value or the minimum hash value which appear during the calculation.

When the division point is not found and the found division point is recorded, the position of window W is shifted byte by byte in the sliding direction (S535) so that the routine returns to S515. When window W (the leading edge in the sliding direction) is in the end position 330 set into the division point record table 300 before the position of window W is shifted in S535, shifting of the position of window W exceeds the end position 330 set into the division point record table 300. In S515, it is thus determined that the calculation is ended.

When it is determined in S515 that the calculation is ended, the division point determination process which aggregates the calculation results of the small calculation ranges after S540 is executed. In this process, the small offset of the division point found in each of the small calculation ranges in the calculation range is the division point.

From the division point 340 in the first small calculation range (Cal1-0 in FIG. 3) in the division point record table 300 (S540), it is checked whether the division point (offset) is recorded into the division point 340 (S545). When the division point is recorded, the division point is the division point of the calculation range (e.g., Cal1 in FIG. 3) to designate the offset, thereby ending the process.

When the division point is not recorded in S545, it is checked whether the next small calculation range is present in the division point record table 300 (S550). In the presence of the next small calculation range in the division point record table 300, checking of recording of the division point in S545 is repeated. In the absence of the next small calculation range in the division point record table 300, the division point cannot be found in the calculation range (e.g., Cal1 in FIG. 3). The division point is the offset of maximum chunk size (Cmax) to end the process.

Figure 6:
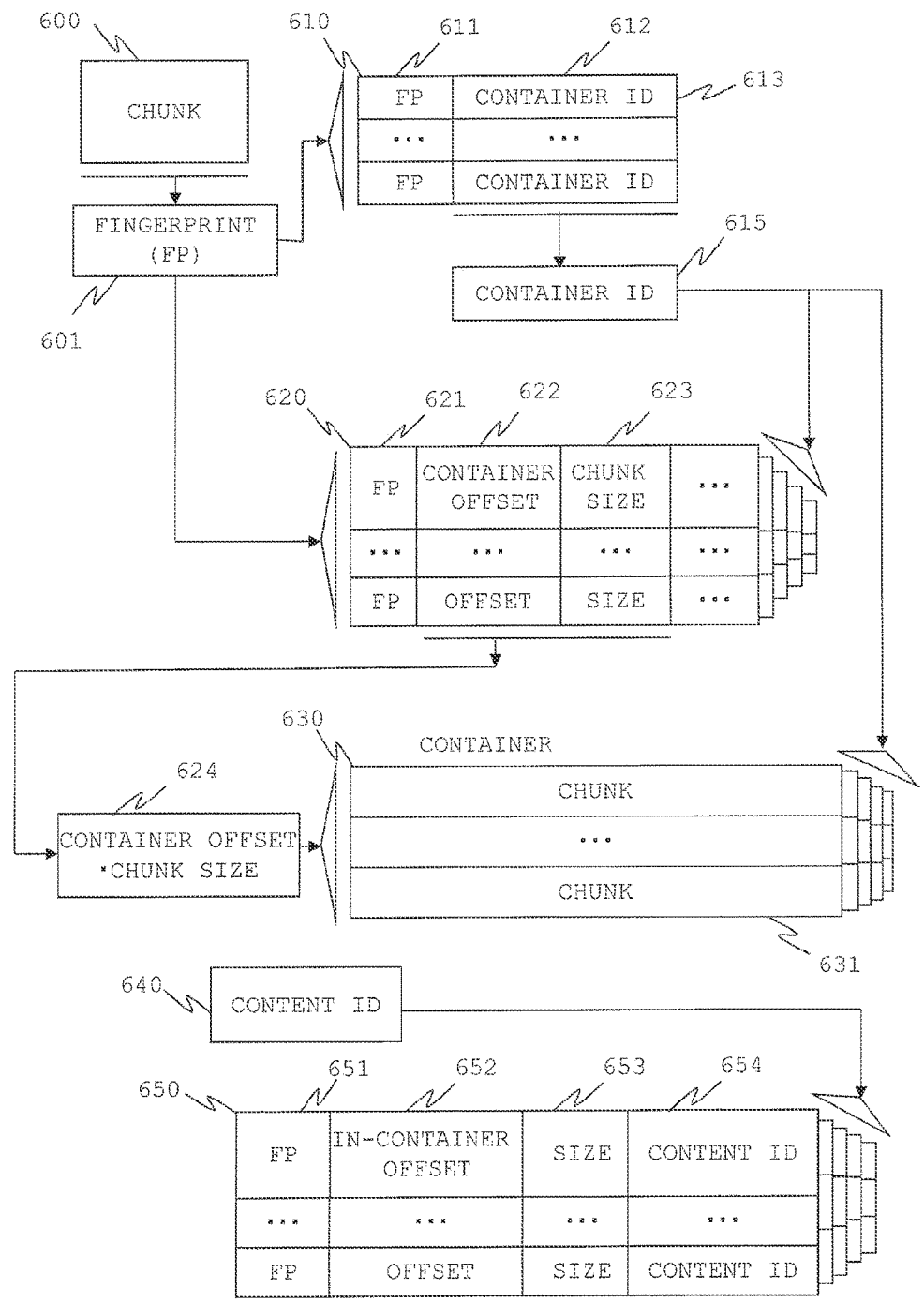
FIG. 6 is a table association chart in a de-duplication storage device 16.

FIG. 6 shows a table association chart in the de-duplication storage device 16. The de-duplication storage device 16 includes a chunk-container table 610, a container management table 620, a container 630, and a content management table 650. For simplifying the description, as a content ID 640, one content ID is illustrated. However, the de-duplication storage device 16 stores a content ID management table for managing a list of contents stored into the de-duplication storage device 16.

A chunk 600 is cut out by the cut-out processing unit 14. A fingerprint (hereinafter, FP) 601 is the hash value of the chunk 600. For instance, SHA1, SHA256, SHA384, SHA512, and MD5 are given as hash functions. The chunk-container table 610, the container management table 620, and the content management table 650 use the FP 601 as an index.

The chunk-container table 610 stores a container ID 612 designating a container prepared for storing the chunk 600 corresponding to an FP 611. The chunk-container table 610 has an entry 613 corresponding to the type of the chunk in the de-duplication storage device 16 (the type of the FP 611). When the cut-out processing unit 14 cuts out a new chunk which is not present in the de-duplication storage device 16, the entry 613 of the FP 611 corresponding to the new chunk and the container ID 612 designating the container prepared for storing the new chunk is added.

A container ID 615 shows that the container ID 612 of the container storing a certain chunk designated by the FP 611 is designated, and describes the later-described process.

The container 630 prepared for storing the chunk 600 is a data block which unifies some chunks. As shown, one container 630 stores at least one chunk.

Since at least one chunk is stored into one container 630, the container management table 620 stores an offset 622 of the stored chunk from the beginning of the container 630 and a size 623 of the chunk corresponding to an FP 621. The container management table 620 may store other chunk information.

A container offset and chunk size 624 shows that the container offset 622 of the container storing a certain chunk designated by the FP 621 and the chunk size 623 are designated, and describes the later-described process.

To refer to the chunk 600 stored in the de-duplication storage device 16, the FP 601 may be used as an index to designate the container ID 615 from the chunk-container table 610. Then, the stored position of the container having the designated container ID 615 designated by the container offset and chunk size 624 may be accessed from the container management table 620.

To store a new chunk, a container which is already present in the de-duplication storage device 16 or a new container is used. The de-duplication system determines the target of the container size. When the container size is too large, the size (the number of entries) of the container management table 620 managing one container becomes large. When the container size is too small, the total size (the number of container IDs) of the container management table 620 depending on the number of containers becomes large. As the target, the container size should be moderate. Each container which stores plural chunks of different sizes has a different size.

The content ID 640 is given corresponding to a content stored in the de-duplication storage device 16. The content management table 650 is formed corresponding to the content ID 640. The content management table 650 stores, in content inclusion order, an FP 651 of each chunk, an offset 652 of the chunk from the beginning of the content, a chunk size 653, and a container ID 654 of a container storing the content.

Content(Cnt) in FIG. 2 designated by the content ID 640 includes chunk A, chunk B and chunk C in that order. From the top entry in the content management table 650, the FP 651 stores the FP of chunk A, the FP of chunk B, and the FP of chunk C, the offset 652 stores 0 (the beginning of chunk A), the chunk size of chunk A (the beginning of chunk B), and the chunk size of chunk A+the chunk size of chunk B (the beginning of chunk C), the size 653 stores the chunk size of chunk A, the chunk size of chunk B, and the chunk size of chunk C, and the container ID 654 stores the container IDs for storing chunk A, chunk B, and chunk C.

Figure 7:
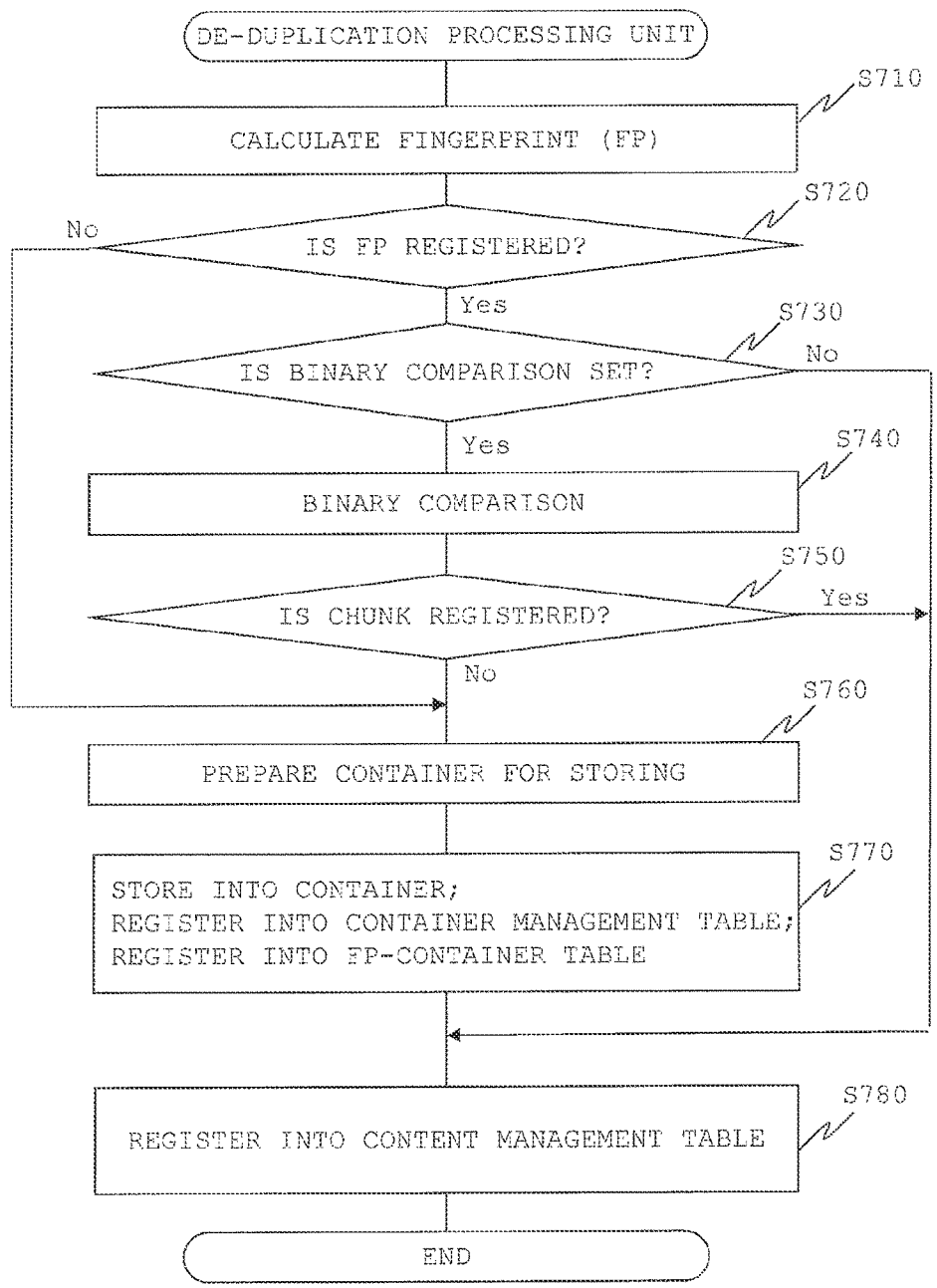
FIG. 7 is a flowchart of the process of a de-duplication processing unit.

FIG. 7 is a flowchart of the process of the de-duplication processing unit 15. The process of the de-duplication processing unit 15 will be described with reference to FIG. 6. The FP 601 is calculated by using the hash function from the cut-out chunk 600 (S710). The entry 613 of the FP 611 matching with the FP 601 is searched for from the chunk-container table 610 (S720). When the FP 601 of the chunk 600 is found in the chunk-container table 610, the FP 601 is already registered, so that the routine moves to S730. It is checked whether binary comparison setting is present (S730). In the absence of binary comparison setting, it is not necessary to newly store the chunk 600. That is, the de-duplication is successful, so that the routine advances to S780. In the presence of binary comparison setting, the container offset and the chunk size of the corresponding fingerprint are obtained from the container management table to take out the chunk data to be compared from the container 630, thereby executing binary comparison (S740). From the binary comparison, it is found that the chunk is already registered. That is, the de-duplication is successful, so that the routine advances to S780.

On the other hand, when the FP 601 of the chunk 600 is absent in the chunk-container table 610 (S720: No) and when the chunk is not already registered (S750: No), a container is prepared for newly storing and registering the chunk 600 (S760). As described above, an already present container or a new container is prepared. In either case, a container ID is designated. To manage the new container, the container management table 620 corresponding to the designated container ID is prepared.

The chunk data 600 is written into the prepared container 630, and corresponding management information (the FP 621, the container offset 622, and the chunk size 623) is written into the corresponding container management table 620 (S770). That is, it is determined into which position in the prepared container the chunk 600 is stored, and the address and the chunk length thereof are written into the right entry (as described above, for the already present container, the next entry following the last entry into which the management information is already written or the top entry of the newly prepared container). With this, when the chunk 600 is read, the FP 611 of the chunk-container table 610 corresponding to the FP 601 is referred to designate the container ID 615. The container offset 622 and the chunk size 623 are read from the entry of the FP 621 of the container management table 620 corresponding to the designated container ID 615 corresponding to the FP 601. Based on these (624), the chunk 600 is read. Further, the FP 601 of the chunk 600 is stored into the chunk-container table 610. Then, the container ID of the prepared container 630 is stored into the container ID 612. Thereafter, the chunk having the same contents as the chunk 600 can be de-duplicated.

The content management information is registered into the content management table 650 (S780). The content to which the chunk 600 belongs is given the content ID 640 by the content processing unit 12. The content ID 640 is notified to the de-duplication processing unit 15 via the cut-out processing unit 14. The content management table 650 is present corresponding to the content ID 640. Each chunk cut out from the content having the content ID 640 corresponds to each entry of the content management table 650. The FP 601 of the chunk 600 is stored into the FP 651 of the content management table 650. The number of bytes from the beginning of the content to the beginning of the chunk 600 is stored into the in-content offset 652. The size of the chunk 600 is stored into the size 653. The container ID 615 of the container storing the chunk 600 is stored into the container ID 654. When the data of the content is read, each chunk forming the content can be read from the corresponding container.

As described above, in the de-duplication system in this example, the small calculation ranges are overlapped at a minimum (window size of m−1) to be subjected to parallel processing. Therefore, while the de-duplication rate can be increased, the de-duplication performance can be improved.

EXAMPLE 2

In Example 1, even when in parallel processing, the division point is found in small calculation range (Cal1−1) except for top small calculation range (Cal1−0) in the calculation range (e.g., Cal1 in FIG. 2), it cannot be identified whether the division point can be adopted until the calculation process of small calculation range (Cal1−0) is ended. In most cases, the process time is a fraction of the number of parallel processes. The calculation process except for top small calculation range (Cal1−0) can thus be wasted.

In addition, to improve the parallel processing performance, it is important that data to be subjected to parallel processing be placed on the cash of a CPU. In particular, parallel processing using the single instruction multiple data process can be faster when data to be subjected to parallel processing is placed on the L1 cash of a CPU. In addition, parallel processing executed by multi-core CPUs can be faster when data to be subjected to parallel processing is placed on the cash shared between the CPUs.

This example has been made in consideration of the above points, and provides the de-duplication system which can eliminate waste of the calculation process to improve the parallel processing performance. The de-duplication system in this example has the same system configuration as Example 1, and the description of the same portions is omitted. The de-duplication system in this example uses a minimum fine grain calculation length as the smallest calculation range to be subjected to be parallel processing.

Figure 8:
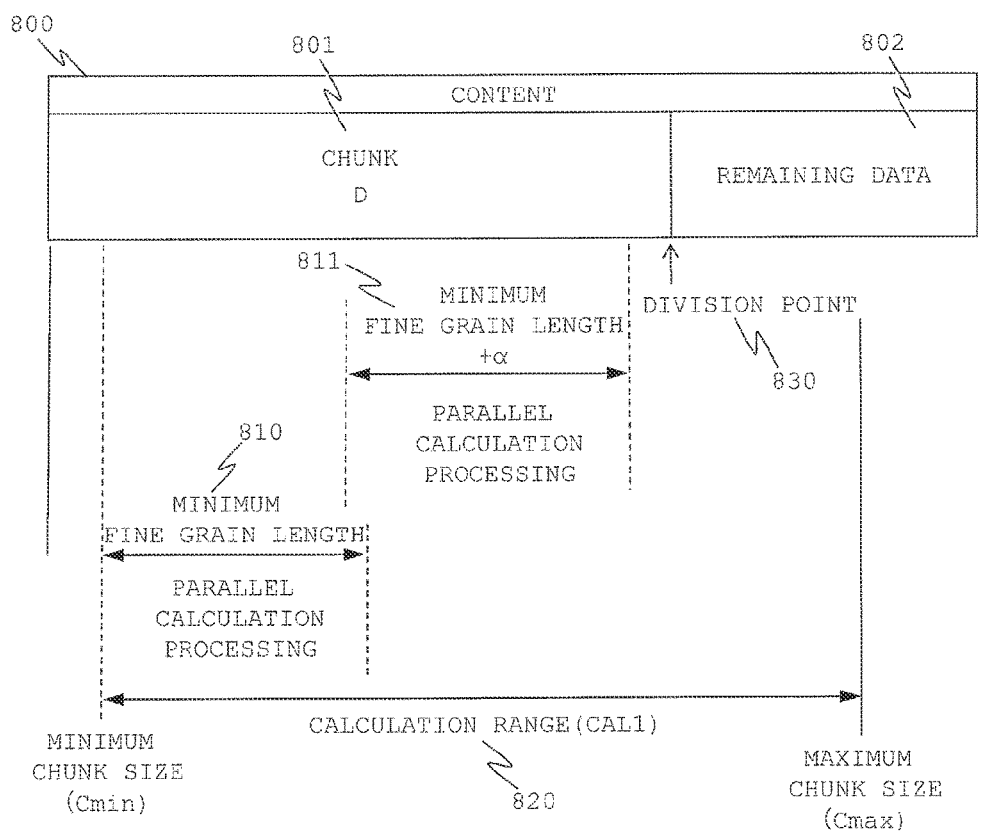
FIG. 8 is a diagram of assistance in explaining parallel processing using a minimum fine grain calculation length.

FIG. 8 is a diagram of assistance in explaining parallel processing using the minimum fine grain calculation length. A content 800 includes a chunk D 801 and remaining data 802. To find the division point of chunk D, a calculation range (Cal1) 820 is divided by the minimum fine grain length to execute parallel processing in a division range 810 having the minimum fine grain length. That is, the division range 810 is divided into the small calculation ranges in Example 1 to subject the small calculation ranges to the rolling hash calculation based on parallel processing. As in Example 1, the start position of the window in the division range 810 is set so that the leading edge of the window (the left end) matches with the minimum chunk size. Until the division point is found in the division range 810 or the process of the calculation range (Cal1) 820 is ended, the division range 810 is updated (for instance, changed to a division range 811) to repeat this process. As the minimum fine grain length, for instance, L1, L2, L3 CPU cache sizes are given. In addition, as shown in A. Z. Broder: Some applications of Rabin's fingerprinting Method, Sequence II: Methods in Communications, Security, and Computer Science, pp. 143-152 (1993), the previous value to be stored in the table is equal to or less than a value obtained by subtracting the table size from each cache size.

When the division point is not found in parallel processing of the first division range 810, the next division range 811 is required to have (the minimum fine grain length+α where α=window size of m-2) to be overlapped with the division range 810. This is for sliding the windows overlapped between the minimum fine grain lengths without missing, as in the hash value calculation of the windows overlapped between the small calculation ranges in Example 1.

Figure 9:
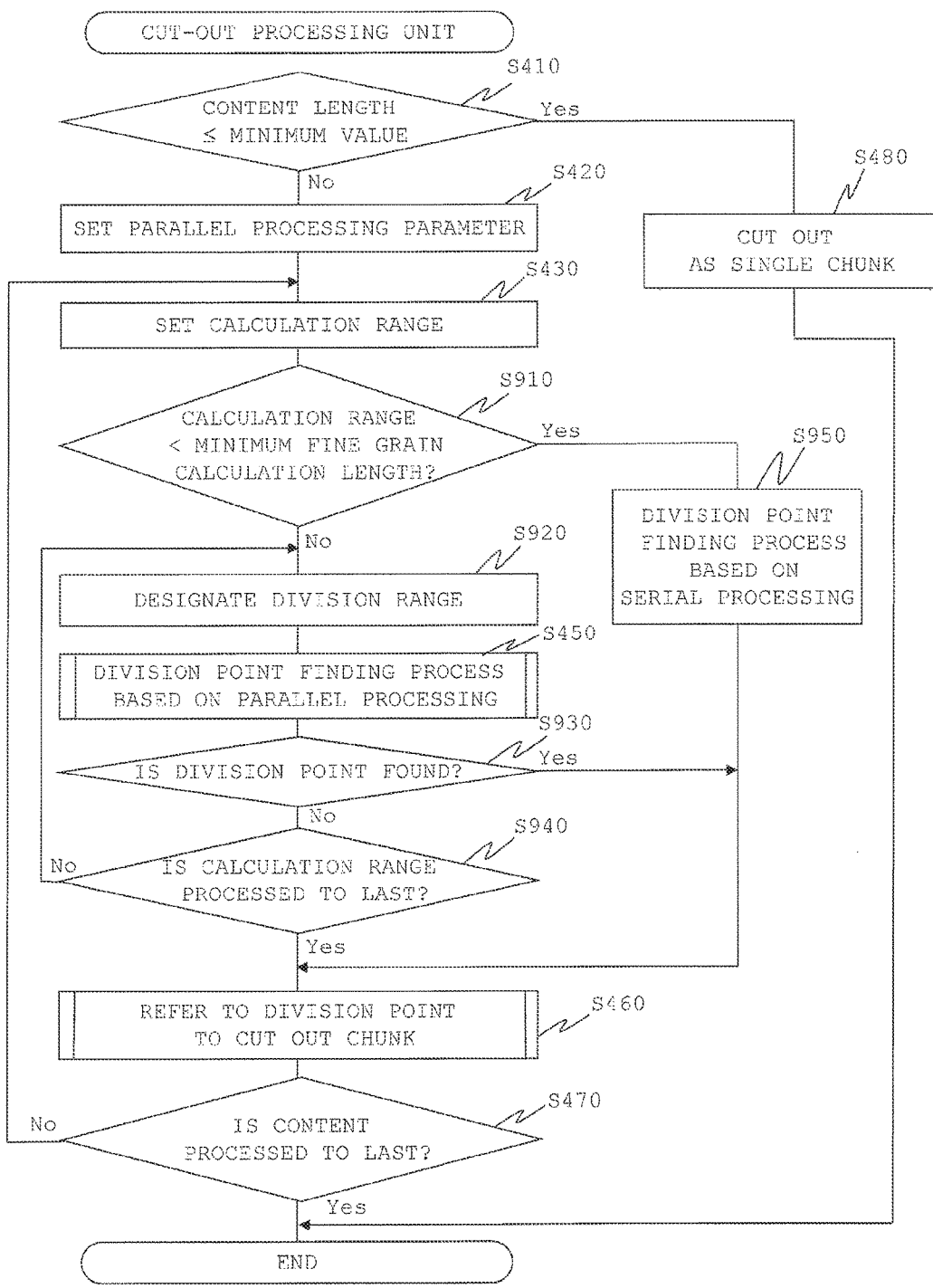
FIG. 9 is a flowchart of the process of the cut-out processing unit in Example 2.

FIG. 9 is a flowchart of the process of the cut-out processing unit 14 in Example 1. This will be described with reference to FIG. 8.

In FIGS. 9, S910 to S950 are added between S430 and S460 of the cut-out processing unit 14 in Example 1 in FIG. 4.

After determination of the calculation range (Cal) 820 in S430, when the calculation range (Cal) 820 is less than the minimum fine grain calculation length 810 (S910), the calculation range (Cal) 820 is subjected to the division point finding process based on serial processing (S950), so that the routine moves to S460. When the calculation range (Cal) 820 is equal to or more than the minimum fine grain calculation length 810, the division range to be processed is designated (S920) to execute the division point finding process based on parallel processing (S450) in the designated division range. The start position of the window for parallel processing has been described with reference to FIG. 8.

The division point finding process determines whether the division point is found (S930). When the division point is found, the routine moves to S460. As in Example 1, to determine that the division point is found, the division point record table 300 is used. However, the calculation range of the division point record table 300 is divided into division ranges which are then subdivided into small calculation ranges.

When the calculation range is not processed to the last (S940), the process is repeated from S920. As in Example 1, when the calculation range is already processed to the last, the division point is the offset of the maximum chunk size (Cmax).

As described above, in the de-duplication system in this example, the calculation range is divided into the small calculation ranges to be subjected to parallel processing. Therefore, waste of the calculation process can be eliminated, the parallel processing can be faster, and the de-duplication performance can be improved.

EXAMPLE 3

In this example, the de-duplication system combines the chunk cut-out process with a different parallel processing method. The de-duplication system has the same system configuration as Example 2.

In FIG. 8, the parallel processing calculation range is between the division ranges having the minimum fine grain lengths and between the small calculation ranges in each of the minimum fine grain lengths.

For instance, the calculation range is determined so that the division ranges having different minimum fine grain lengths are calculated in parallel by plural CPUs, so that the CPUs apply the single instruction multiple data process to the small calculation ranges in each of the division ranges. The parallel processing can be thus faster.

As described above, in the storage system according to this embodiment, the parallel processing calculation range is divided to overlap data between the division ranges thereof, so that the different parallel processing method is combined inside and outside the calculation ranges. Thus, the parallel processing can be faster, and the de-duplication performance can be improved.

EXAMPLE 4

In Example 2, parallel processing is executed by the introduced minimum fine grain calculation lengths. Thus, waste of the calculation can be eliminated, and the parallel processing performance can be further improved in consideration of the CPU cash size. However, memory access is slower than cash access, so that the number of memory accesses is required to be reduced for making the process faster. In addition, since the cache size is different according to CPU, the minimum fine grain calculation lengths are not always an optimum value.

This example has been made in consideration of the above points, and provides the de-duplication system which changes the parameter at the appropriate times while measuring the performance of the chunk cut-out process, thereby having a higher performance. By way of example, shown is a method for adjusting the fine grain calculation length applied to the division range in Example 2 by using a predetermined fine grain calculation length variable parameter.

A fine grain calculation length variable parameter (550) of a parameter table 500 is a parameter for temporarily changing the fine grain calculation length applied to the calculation range, and is a floating point of 1 or more.

Figure 10:
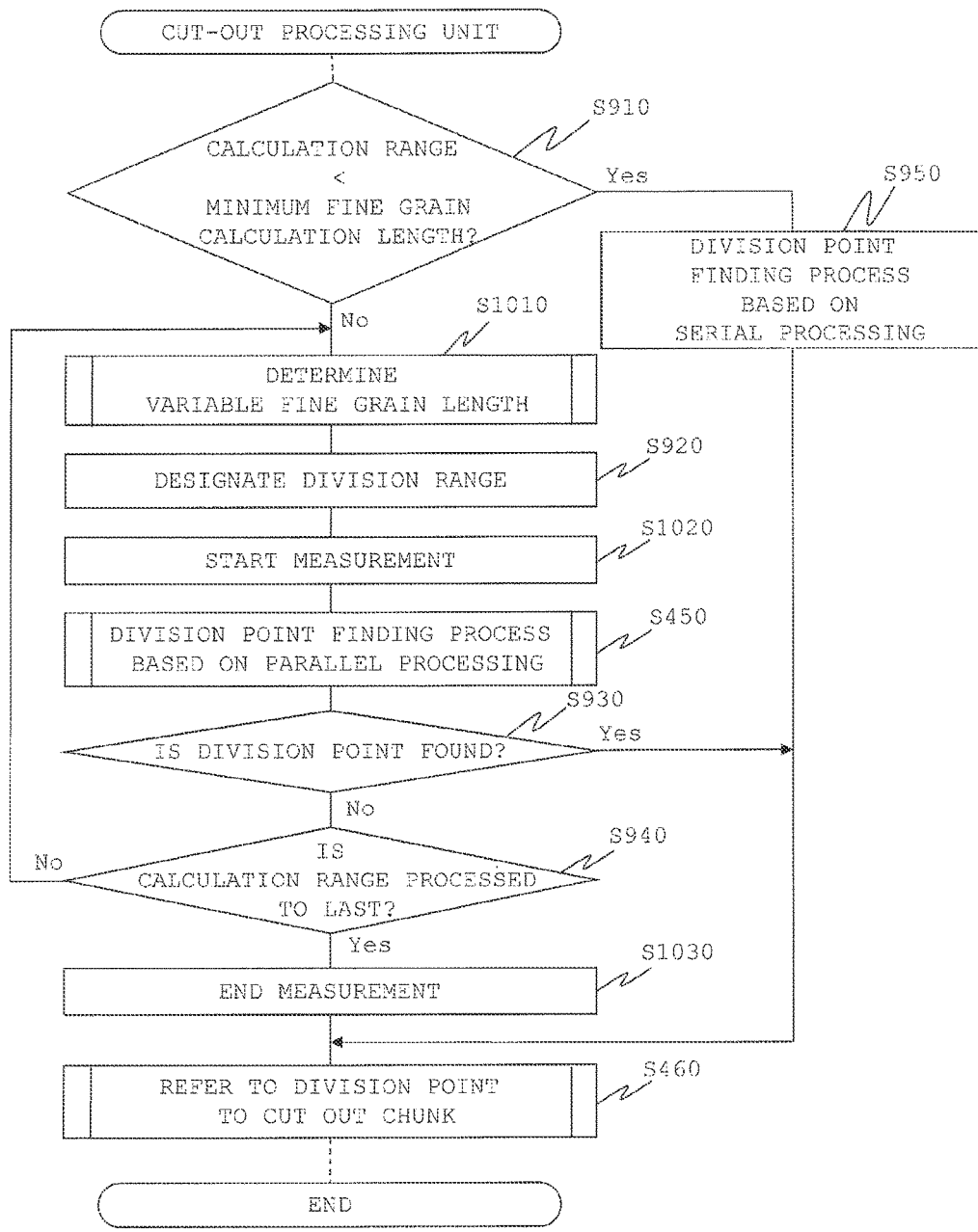
FIG. 10 is a flowchart of the process of the cut-out processing unit in Example 4.

FIG. 10 is a flowchart of the process of the cut-out processing unit 14 in this example. In FIG. 10, S1010 to S1030 are added between steps S910 and S460 in FIG. 9. A variable fine grain length is determined (S1010). The performance of the division point finding process based on parallel processing is measured between start of the measurement (S1020) and end of the measurement (S1030). For simplicity, in FIG. 10, part of FIG. 9 is omitted.

Figure 11:
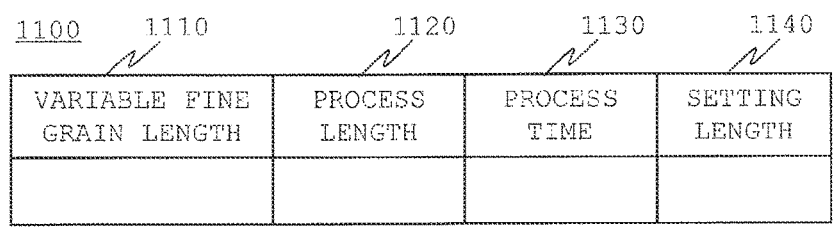
FIG. 11 is a measurement table used in a variable fine grain length determination process.

FIG. 11 is a measurement table 1100 used for the variable fine grain length determination process (S1010) in FIG. 10. The measurement table 1100 has a variable fine grain length 1110, a process length 1120, a process time 1130, and a setting length 1140, and records the chunk division performance of the set variable fine grain length 1110.

Figure 12:
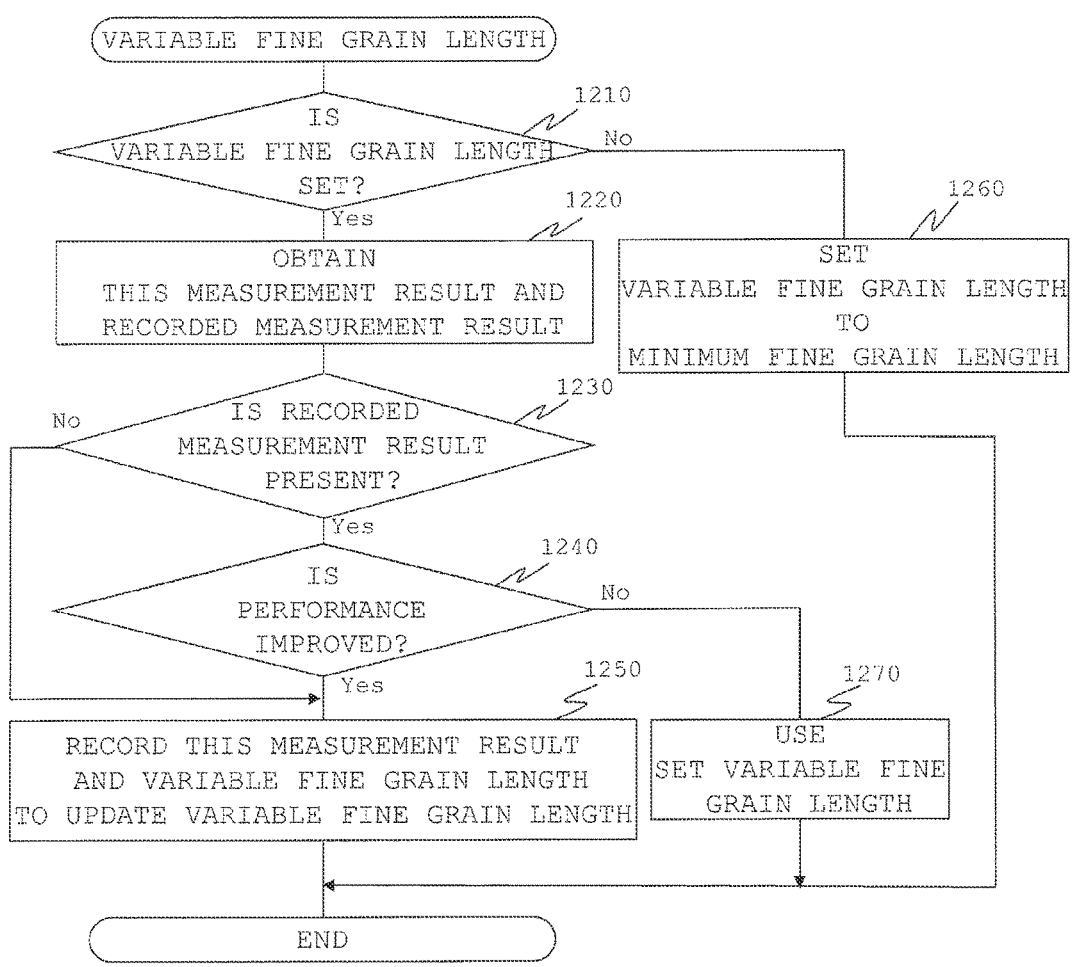
FIG. 12 is a flowchart of the variable fine grain length determination process.

FIG. 12 is a flowchart of the variable fine grain length determination process (S1010) in FIG. 10. It is checked whether the variable fine grain length is set to the variable fine grain length 1110 of the measurement table 1100 (S1210). When the variable fine grain length is not set, the minimum fine grain length (810 in FIG. 8) is set to the variable fine grain length 1110 (S1260). When the variable fine grain length is set, the measurement result of the chunk division performance recorded into the measurement table 1100 is obtained (S1120). The measurement result is recorded data recorded into the process length 1120, the process time 1130, and the setting length 1140 in the measurement table 1100.

In the absence of the recorded measurement result (S1230), this measurement result and the variable fine grain length are recorded to update the variable fine grain length by a value obtained by multiplying the current variable fine grain length by the fine grain calculation length variable parameter which is a predetermined value (S1250). In the presence of the recorded measurement result, performance is calculated from the process length 1120 and the process time 1130 of the recorded measurement result and is compared with the performance of this measurement result calculated from the process length and the process time. When the performance is improved (S1240), the routine advances to S1250. When the performance is not improved, the set variable fine grain length 1110 is used.

As described above, in the de-duplication system in this example, the variable fine grain length which is a parallel processing parameter is adjusted. The de-duplication performance can thus be improved.

EXAMPLE 5

Typically, the hash value of the heavy rolling hash calculation (the calculation load is high) is used to slide the window for calculating remaining hash values. That is, the heavy rolling hash calculation and the light rolling hash calculation are necessary.

In the de-duplication system in this example, it is assumed that particular data is present before the rolling hash calculation range, thereby shifting the window. The hash calculation process is eliminated to realize a rolling hash only by the rolling hash calculation process. The de-duplication system in this example has the same system configuration as Example 1, and the description of the same portions is omitted.

Figure 13A:
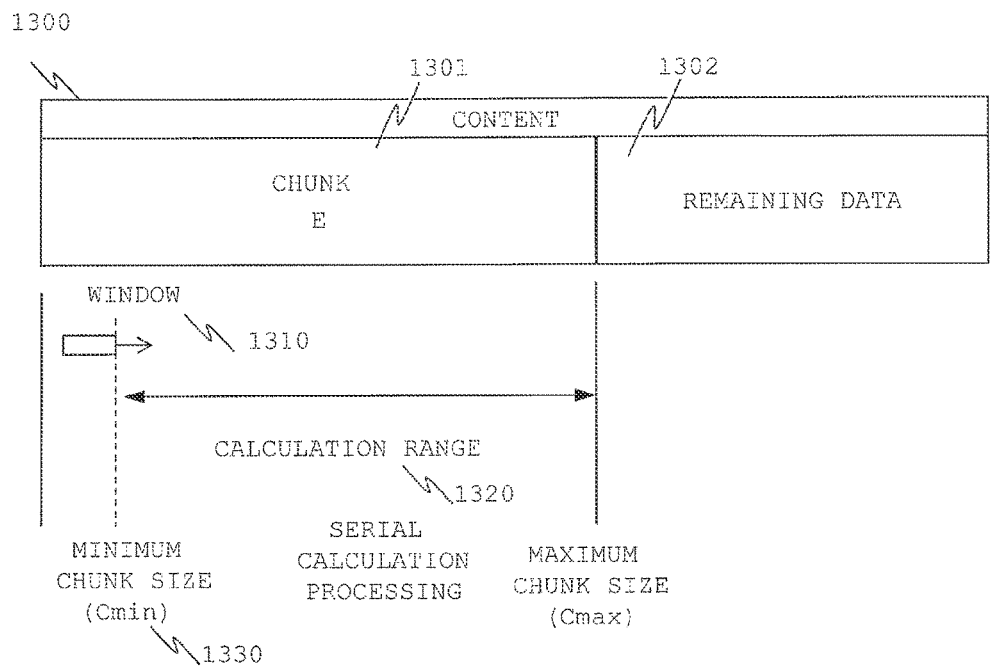
FIGS. 13A and 13B are diagrams of assistance in explaining a chunk division point determination process.

FIG. 13A is a diagram of assistance in explaining a process for calculating the division point of a chunk E 1301, in which a content 1300 includes the chunk E 1301 and remaining data 1302.

As shown in A. Z. Broder: Some applications of Rabin's fingerprinting Method, Sequence II: Methods in Communications, Security, and Computer Science, pp. 143-152 (1993), in the rolling hash calculation, a remainder obtained by dividing continuous data of window size of m by a certain polynomial expression is a hash value. Since, of course, the remainder obtained by dividing 0×0 is 0, it is not necessary to execute the hash calculation itself. After determination of the calculation range 1320, it is assumed that the 0×0 data is continuous by the window size of m before the start position in the calculation range 1320, that is, before the minimum chunk size (Cmin) 1330. Then, the window 1310 is shifted by the size of m (or is changed so that the window includes the 0×0 data) to calculate the roll hash. At this time, the hash value obtained by repeating sliding of the window 1310 by the size of m is the same as the remainder obtained by dividing the data continued by the window size of m from the minimum chunk size (Cmin) 1330 by the certain polynomial expression.

Figure 13B:
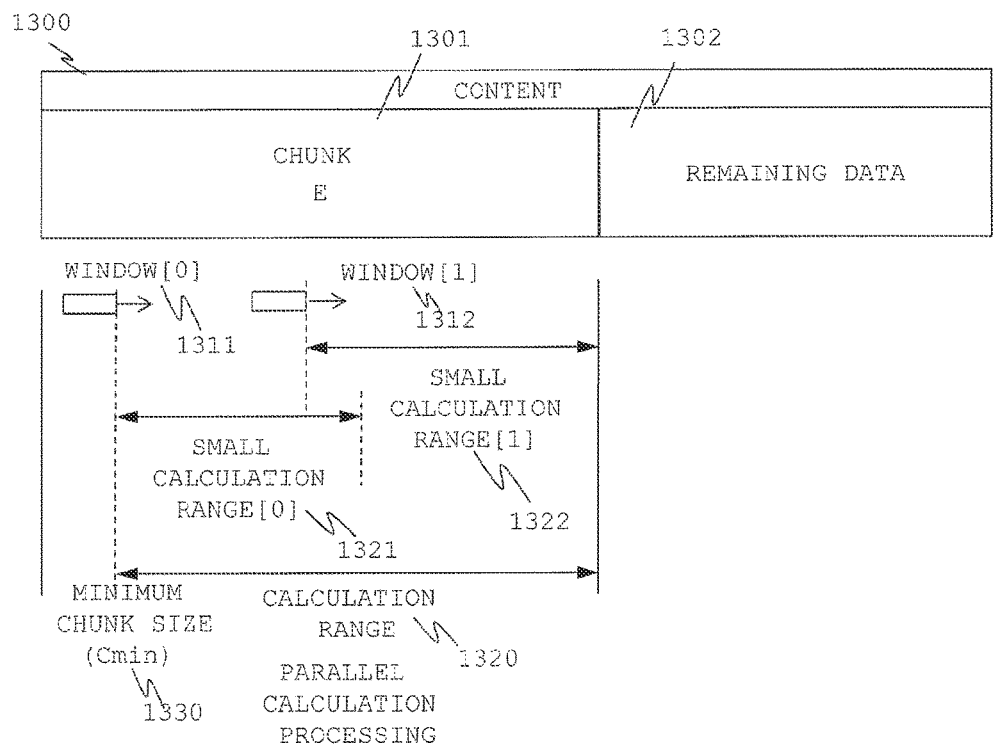

FIG. 13B is a diagram of assistance in explaining the method shown in FIG. 13A subjected to parallel processing. Here, for simplicity, the number of parallel processes is 2. After determination of the calculation range 1320, small calculation ranges [0] 1321 and [1] 1322 are calculated. At this time, as in Example 1, as for the small calculation range [1] 1321, the start position is set so that data and the small calculation range [0] are overlapped by (window size of m−2). Then, it is assumed that the 0×0 data is present by the fixed window size before each of the small calculation ranges to apply rolling hash parallel processing.

This example is applicable to the conventional method shown before Example 1 and the Examples after Example 1.

As described above, in the de-duplication system in this example, it is assumed that the particular data pattern is present before the rolling hash calculation range. Therefore, the heavy hash calculation can be eliminated, and the system configuration which has only the rolling hash calculation can be simple.

EXAMPLE 6

In Examples 1 to 5, serial processing in the variable chunk cut-out process is executed based on parallel processing by overlapping the window data. After determination of the division point of the variable chunk, the division point determination process for the next chunk is executed. Thus, the division point determination process is also executed based on serial processing.

For instance, after determination of the division point of chunk A, chunk B in FIG. 2 is required to be cut out. After determination of the division point of chunk B, chunk C can be cut out.

In this example, the variable length division process is executed at plural nodes, and data at a minimum are then overlapped to execute the division process at each of the nodes. Therefore, while the de-duplication rate can be improved, the process based on parallel processing can be faster.

Figure 14:
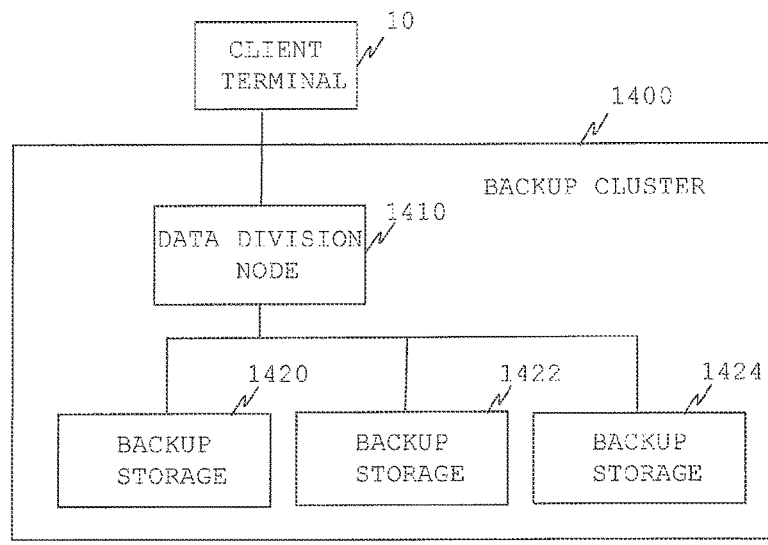
FIG. 14 is a block diagram of a de-duplication system in Example 6.

FIG. 14 is a block diagram of the de-duplication system in this example. In the de-duplication system in this example, a backup cluster 1400 is used to execute the de-duplication process. The backup cluster 1400 is a multi-node system including a data division node 1410, and backup storages 1420, 1422, and 1424. Each of the backup storages is a backup storage 100 in FIGS. 17 and 18, or a backup storage 200 in FIG. 19. Here, three backup storages are illustrated, but two or more backup storages may be used.

Figure 15:
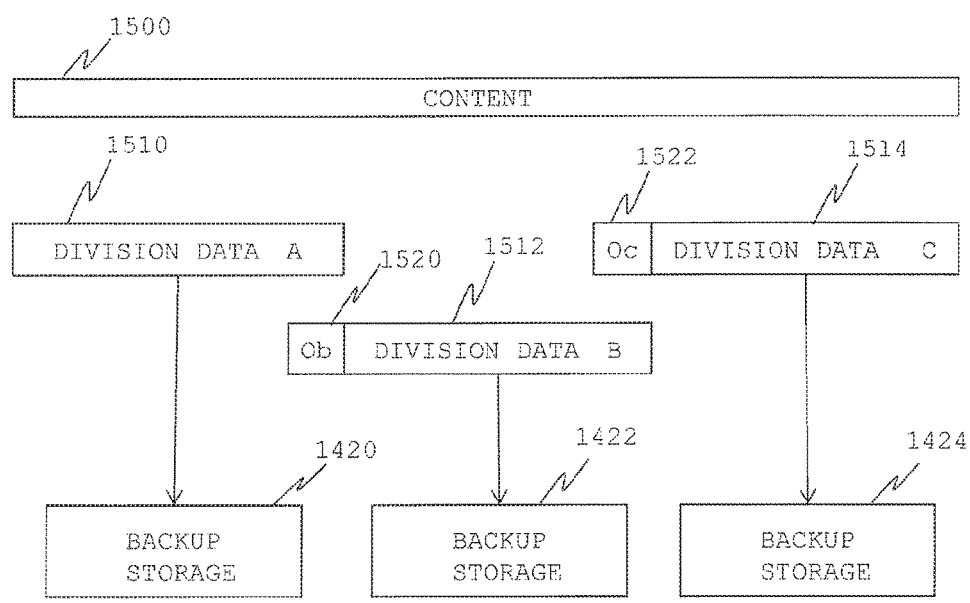
FIG. 15 is an explanatory view of multi-node parallel processing.

FIG. 15 is an explanatory view of multi-node parallel processing in which a content 1500 includes data divided by a data division node 1410, and the backup storages 1420, 1422, and 1424 at multiple nodes subject the division data to the chunk cut-out process and the de-duplication process. Here, for simplifying the description, minimum chunk size (Cmin) is 0.

The data division node 1410 substantially equally divides the inputted content 1500 by the maximum number of multiple nodes in parallel, which is the number of backup storages. Each division point is referred to as an equal division point. For instance, division data A 1510, division data B 1512, division data C 1514 are created. To overlap the division data at a minimum, Ob 1520 is added at the front of division data B, and Oc 1522 is added at the front of division data C. The size of the overlap data Ob 1520 and Oc 1522 is e.g., maximum chunk size (Cmax).

Then, the chunk division process is executed at the backup storage nodes. At this time, it is necessary to take the matching ability so that the chunks having the overlapped portions are not duplicated at plural nodes and to determine a rule for that.

For instance, in the division data B 1512, the chunk which is independently cut out in the overlap portion Ob 1520 is removed, and the chunk which is cut out across the overlap portion Ob 1520 and the division data B 1512 is an effective chunk at the division node B 1512.

In addition, in the chunk division process for the division data A 1510, the chunk which has reached the boundary between the division data A 1510 and the division data B 1512 is removed without the chunk division point (including division according to the maximum chunk size). In this way, the matching ability can be maintained. The same rule is applied to the chunk including the overlap portion Oc 1522 of the division data B 1512 and the division data C 1514.

Figure 16:
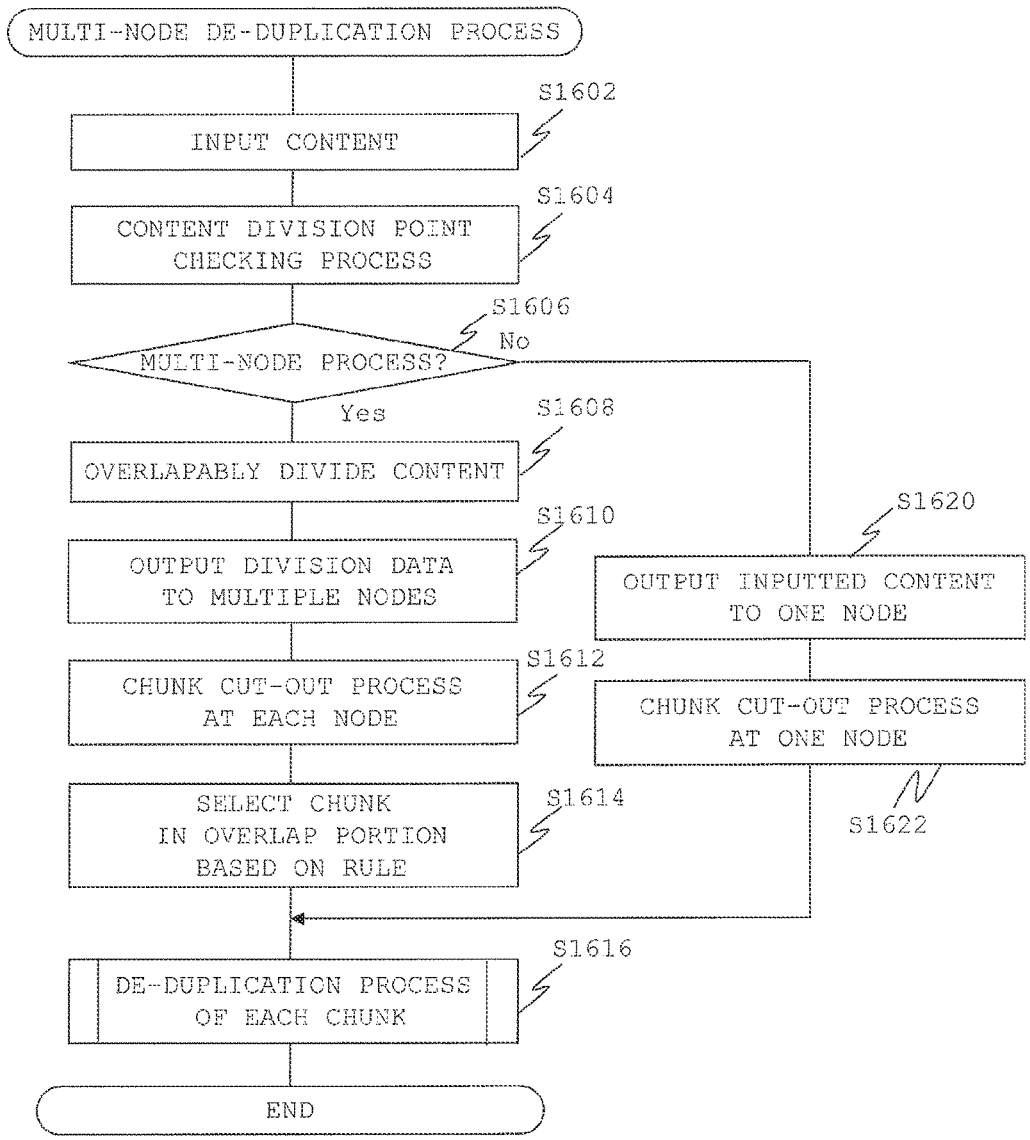
FIG. 16 is a flowchart of a de-duplication process at multiple nodes.

FIG. 16 is a flowchart of the de-duplication process at multiple nodes. The data division node 1410 inputs a content thereinto (S1602). The data division node 1410 subjects the content to the division point checking process (S1604). In the division point checking process, it is determined which of the multi-node process and the single-node process is executed. First, the length (size) of the inputted content is divided by the maximum number of multiple nodes in parallel to determine the equal division point. As described in Example 1, the quotient of the division which is not an integer is converted to an integer. From there, the rolling hash calculation for checking the presence of the chunk division point is searched for by the maximum chunk size. When the data division point is found by checking at all equal division points, the multiple-node process is determined. When the division point is not found, the single-node process is determined. In addition, the range for checking the presence of the chunk division point is not limited to the maximum chunk size. The chunk division point may be searched for until it is found, so that with the found offset as the division point, the data may be overlapped by the maximum chunk size to determine the multi-node process. At this time, the single-node process is determined when the division point cannot be found by the chunk division point presence checking process so that searching is executed to the different equal division point. In the latter, the data amounts of assigned to the nodes are different.

The data division node 1410 determines whether the multi-node process is executed (S1606). When the multi-node process is not executed, the inputted content is outputted to the selected single node (S1620). The single node subjects the inputted content to the chunk cut-out process (FIG. 4) (S1622), so that the routine advances to S1616.

In the multi-node process, the content is overlappedly divided (S1608). Each division data piece is outputted to each of the nodes 1420, 1422, and 1424 (S1610). Each of the nodes 1420, 1422, and 1424 uses the divided content as the calculation range or resets the calculation range which is twice or more the difference between the maximum chunk size and the minimum chunk size to execute the chunk cut-out process (FIG. 4) (S1612). Each of the nodes 1420, 1422, and 1424 selects the chunk in the overlap portion based on the rule (S1614). The de-duplication process of each of the cut-out chunks (FIG. 7) is executed (S1616).

In addition, as in Example 3, the multi-node parallel processing, the multi-core parallel processing at each node, and the parallel processing using the single instruction multiple data process are combined to improve the performance.

As described above, in the de-duplication system in this example, the contents distributed to plural nodes are overlappedly processed. Therefore, while the de-duplication rate can be improved, the parallel processing at plural nodes is enabled. Further, the different parallel processing methods are combined, as needed. The de-duplication system can have higher performance.

Hereinafter, an example of the de-duplication system (storage system) which applies the Examples will be described.

Figure 17:
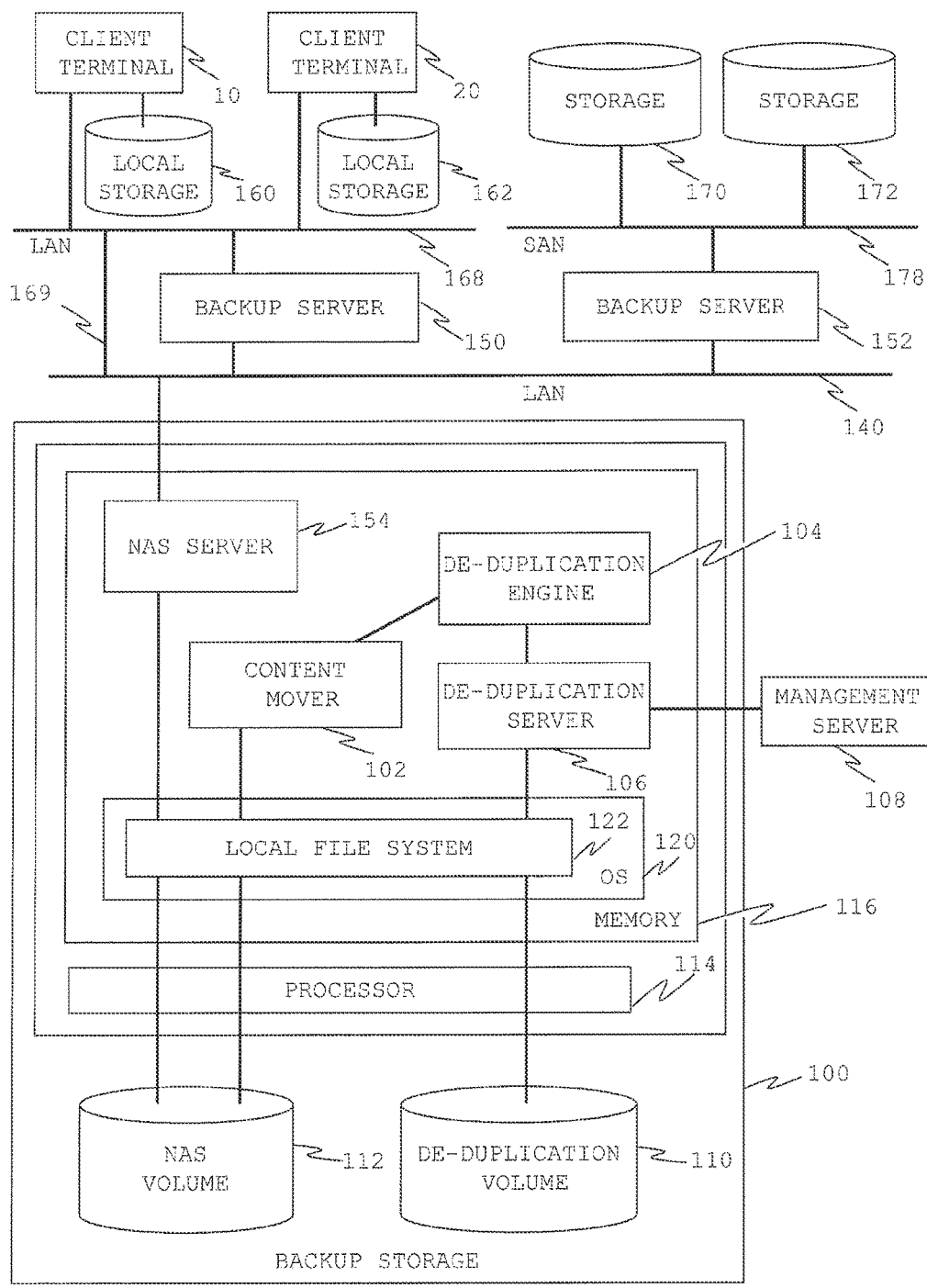
FIG. 17 is the configuration example of a post process de-duplication system.

FIG. 17 is the configuration example of a post process de-duplication system. In the post process de-duplication system, data stored into the storage once is taken out to be de-duplicated. Storage capacity can thus be reduced.

The backup storage 100 includes a processor 114, a memory 116, and storage devices 110 and 112. Under the control of an OS 120, a content mover 102, a de-duplication engine 104, a de-duplication server 106, and a NAS server 154 are operated.

The NAS server 154 is connected to backup servers 150 and 152 via a LAN 140. The backup server 150 is connected to client terminals (computer systems) 10 and 20 via a LAN 168. The client terminals 10 and 20 include local storages 160 and 162, respectively. The backup server 150 unifies data stored in the local storages 160 and 162 to store the unified data as a backup file (content) into the backup storage 100. The NAS server 154 stores the backup file into the NAS volume 112 by using a local file system 122 of the OS 120.

The backup server 152 is connected to the LAN 140, accesses storage devices 170 and 172 via an SAN 178, and unifies data stored into them to store the unified data as a backup file (content) into the backup storage 100. The NAS server 154 stores the backup file (content) into the NAS volume 112. A communication path 169 via a router may be provided between the LAN 140 and the LAN 168.

The content mover 102, the de-duplication engine 104, and the de-duplication server 106 are software components which control the de-duplication described in the Examples. The content mover 102 reads the backup file stored into the NAS volume 112 to output the backup file as a content to the de-duplication engine 104. The combination of the NAS server 154 and the content mover 102 is equivalent to the content processing unit 12 in FIG. 1. The de-duplication engine 104 cuts out the chunk from the content inputted from the content mover 102. The de-duplication engine 104 is equivalent to the cut-out processing unit 14 in FIG. 1. The de-duplication server 106 determines the overlapped state of the chunk cut out by the de-duplication engine 104. The chunk is written into the de-duplication volume 110, if necessary. Then, the de-duplication server 106 is equivalent to the de-duplication processing unit in FIG. 1. In addition, the NAS volume 112 is equivalent to the content storage device 13 in FIG. 1. The de-duplication volume 110 is equivalent to the de-duplication storage device 16 in FIG. 1.

The de-duplication server 106 is connected to the management server 108 outside the backup storage 100, and enables the operation and monitoring of the post process de-duplication system from a management server 108.

Figure 18:
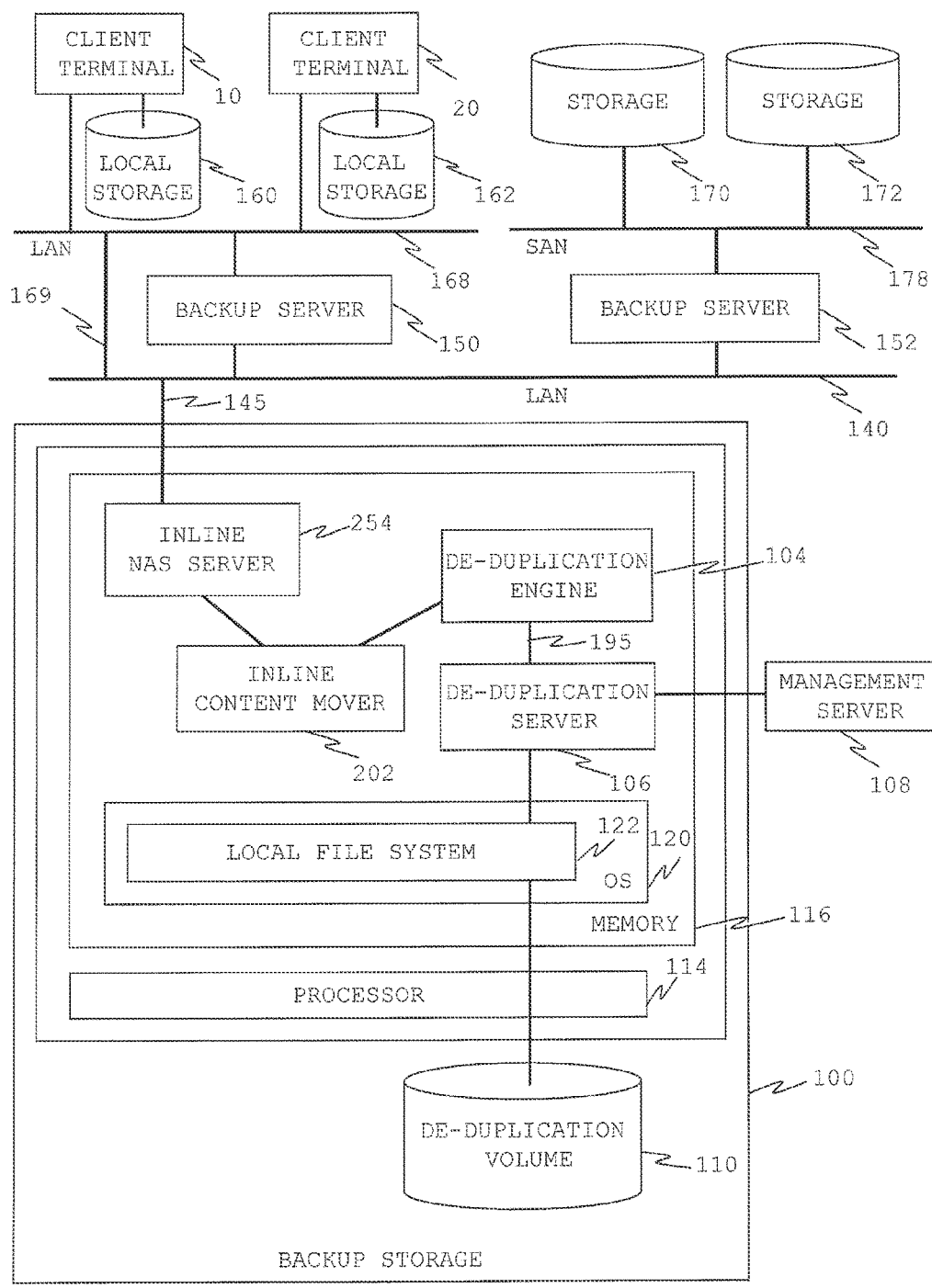
FIG. 18 is the configuration example of an inline de-duplication system.

FIG. 18 shows the configuration example of an inline de-duplication system. The inline de-duplication immediately de-duplicates contents from the client terminals (computer systems) 10 and 20 to write the de-duplicated contents into the storage (de-duplication volume 110). The NAS volume 112 shown in FIG. 17 is thus unnecessary. In FIG. 1, in consideration of the inline de-duplication system, the content processing unit 12 is not required to store the content into the content storage device 13, which has been described in FIG. 1.

In the configuration of the inline de-duplication system in FIG. 18, the NAS server 154 in FIG. 17 is replaced with an inline NAS server 254, and the content mover 102 in FIG. 17 is replaced with an inline content mover 202. The inline NAS server 254 outputs the backup file (content) to the inline content mover 202 when the backup servers 150 and 152 request the storing of the backup file (content). The inline content mover 202 outputs the inputted backup file as a content to the de-duplication engine 104. Other configuration and operation overview of the inline de-duplication system are the same as those of the post process de-duplication system in FIG. 17.

Figure 19:
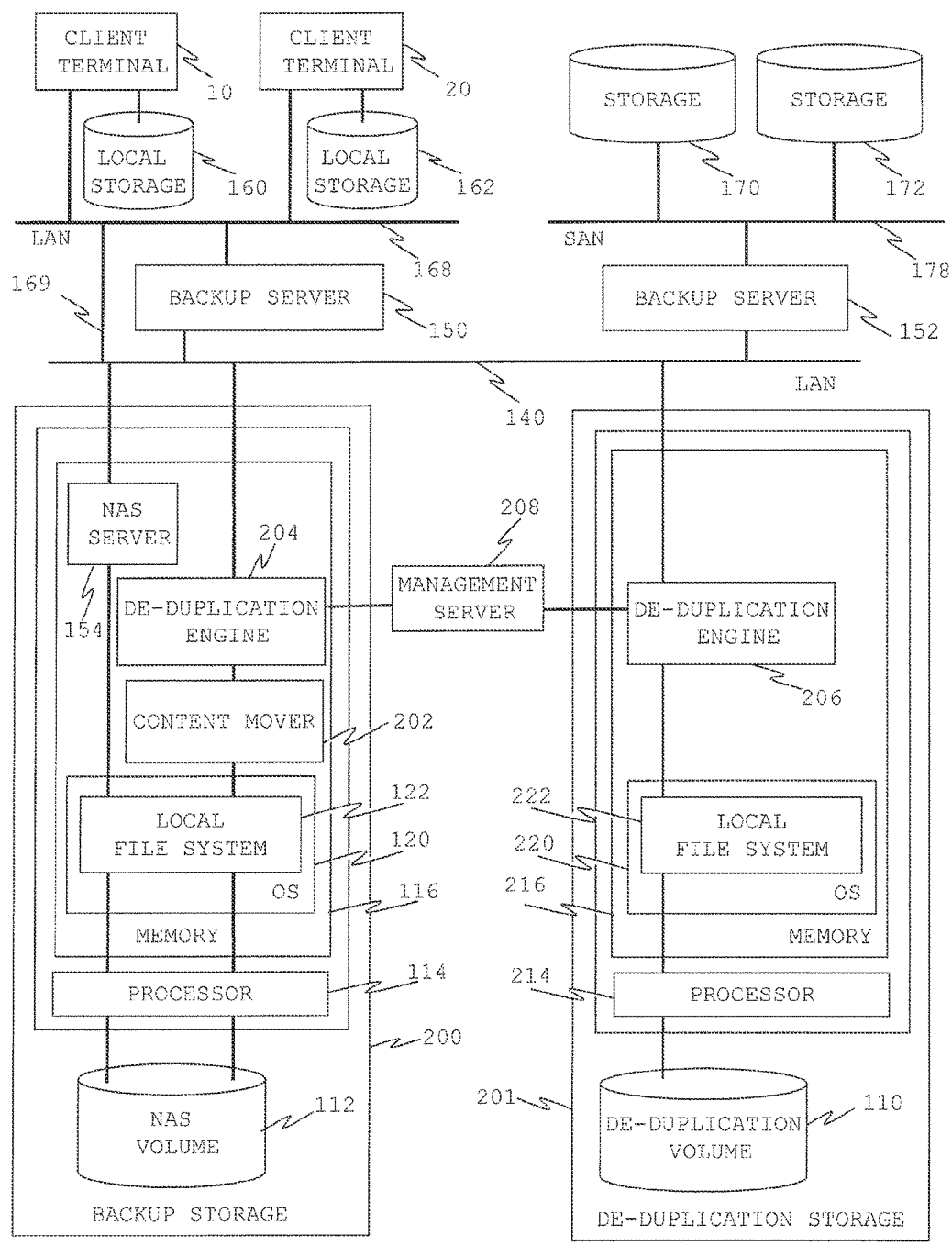
FIG. 19 is a system example in which a backup storage and a de-duplication storage are isolated.

FIG. 19 shows a system example in which the backup storage 200 and a de-duplication storage 201 are isolated as hardware to be different server devices or virtual server devices. The backup storage 200 includes the NAS volume 112, the processor 114, the memory 116, the OS 120, and the local file system 122. As software, the NAS server 154, the content mover 202, and a de-duplication engine 204 are operated. In the same manner, the de-duplication storage 201 includes the de-duplication volume 110, a processor 214, a memory 216, an OS 220, and a local file system 222. As software, a de-duplication server 206 is operated.

The interface between the de-duplication engine 204 and the de-duplication server 206 is determined so that a request and a response are transmitted and received via the LAN 140. A management server 208 connects the de-duplication engine 204 and the de-duplication server 206. The management server 208 monitors the operation parameter setting and the operated state of the de-duplication engine 204. In addition, the management server 208 monitors the operation parameter setting and the operated state of the de-duplication server 206. Other configuration and operation overview of the de-duplication system of this configuration are the same as those of the post process de-duplication system in FIG. 17.

The present invention which can improve the de-duplication performance has been described along the Examples. However, the embodiment simplifies the understanding of the present invention and the present invention is not limitatively understood. The present invention can be changed and modified without departing its purport and includes equivalents thereto.

REFERENCE SIGNS LIST

10: a client terminal, 11: a de-duplication content server, 12: a content processing unit, 13: a content storage device, 14: a cut-out processing unit, 15: a de-duplication processing unit, 16: a de-duplication storage device, 300: a division point record table, 610: a chunk-container table, 620: a container management table, 630: a container, 640: a content ID, 650: a content management table, 1100: a measurement table.

What is claimed is:

1. A de-duplication system comprising:
a memory;
a first storage device;
a second storage device;
a first processor, wherein the processor:
    determines a calculation range of content input from a client terminal based upon a predetermined maximum chunk size and a predetermined minimum chunk size,
    sets at least a first and second small calculation ranges, both the first and second small calculation ranges being smaller than the first calculation range,
    sets the positions of windows for rolling hash calculation with respect to the first and second small calculation ranges at integral multiples of a width of each of the windows so that successive windows overlap, and
    subjects the at least first and second small calculation ranges to a rolling hash calculation with shifting of the windows set to the first and second small calculation ranges based on parallel processing to form a cut-out chunk from the content; and
a second processor communicatively coupled to the memory, the first storage device, the second storage device, and the first processor, wherein the second processor:
    does not store the cut-out chunk into the first storage device when the chunk having the same contents as the cut-out chunk is already stored in the first storage device.

2. The de-duplication system according to claim 1, wherein the first processor divides the calculation range into at least two division ranges, and divides each of the division ranges into the at least first and second small calculation ranges.

3. The de-duplication system according to claim 2, wherein the first processor subjects the calculation range less than a predetermined minimum fine grain calculation length to the rolling hash calculation with shifting of the windows based on serial processing to cut out the chunk from the content.

4. The de-duplication system according to claim 3, wherein the first processor subjects the at least first and second division ranges to the rolling hash calculation with shifting of the windows based on parallel processing by a plurality of CPUs.

5. The de-duplication system according to claim 2, wherein first processor sets each of the division ranges to a variable fine grain calculation length, measures performance of parallel processing in the at least first and second small calculation ranges of the rolling hash calculation with shifting of the windows, updates the variable fine grain calculation length when the measured performance is improved, and sets the division ranges to the updated variable fine grain calculation length to repeat the measurement of the performance.

6. The de-duplication system according to claim 1, wherein first processor assumes that 0×0 data is continuous by the size of the windows before setting the window position, changes the position of the windows so that the windows include the 0×0 data, and executes the rolling hash calculation with shifting of the windows.

7. The de-duplication system according to any one of claim 1, wherein the first processor divides the content into a number of multiple nodes so that the rolling hash calculation between the multiple nodes is continuous, each of the multiple nodes setting the calculation range in the divided content to cut out the chunk.

8. A de-duplication method in a de-duplication system which de-duplicates a chunk stored into a storage device, the de-duplication method comprising the steps of:
- inputting a content from a client terminal;
- determining a calculation range from a predetermined maximum chunk size and a predetermined minimum chunk size;
- dividing the calculation range into at least first and second small calculation ranges;
- setting the positions of windows for rolling hash calculation at integral multiples of a width of each of the windows so that successive windows overlap;
- subjecting the at least first and second small calculation ranges to a rolling hash calculation with shifting of the windows based on parallel processing to form a cut-out chunk from the content; and
- not storing the cut-out chunk into the storage device when the chunk having the same contents as those of the cut-out chunk is already stored into the storage device.

9. The de-duplication method according to claim 8, further comprising the steps of:
- dividing the calculation range into at least first and second division ranges; and
- dividing each of the division ranges into the at least first and second small calculation ranges.

10. The de-duplication method according to claim 9, further comprising the step of subjecting the calculation range less than a predetermined minimum fine grain calculation length to the rolling hash calculation with shifting of the windows based on serial processing to cut out the chunk from the content.

11. The de-duplication method according to claim 10, further comprising the step of subjecting the at least first and second division ranges to the rolling hash calculation with shifting of the windows based on parallel processing by a plurality of CPUs.

12. The de-duplication method according to claim 9, further comprising the steps of:
- setting each of the division ranges to a variable fine grain calculation length;
- measuring performance of parallel processing in the at least first and second small calculation ranges of the rolling hash calculation with shifting of the windows;
- updating the variable fine grain calculation length when the measured performance is improved; and
- setting the division range to the updated variable fine grain calculation length to repeat the measurement of the performance.

13. The de-duplication method according to claim 8, further comprising the steps of:
- assuming that 0×0 data is continuous by the size of the windows before setting the position of the windows
- changing the positions of the windows so that the windows include the 0×0 data; and
- executing the rolling hash calculation with shifting of the windows.

14. The de-duplication method according to claim 8, further comprising the step of dividing the content into a number of multiple nodes so that the rolling hash calculation between the multiple nodes is continuous, each of the multiple nodes setting the calculation range in the divided content to cut out the chunk.

* * * * *